(12) United States Patent
Mori et al.

(10) Patent No.: US 8,903,613 B2
(45) Date of Patent: Dec. 2, 2014

(54) TRACTION TRANSMISSION CAPACITY CONTROL DEVICE

(75) Inventors: Kenichi Mori, Sagamihara (JP);
Hidetoshi Taniguchi, Zama (JP);
Yutaka Kaneko, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 45 days.

(21) Appl. No.: 13/996,068

(22) PCT Filed: Oct. 28, 2011

(86) PCT No.: PCT/JP2011/074942
§ 371 (c)(1),
(2), (4) Date: Jun. 26, 2013

(87) PCT Pub. No.: WO2012/086312
PCT Pub. Date: Jun. 28, 2012

(65) Prior Publication Data
US 2013/0289838 A1    Oct. 31, 2013

(30) Foreign Application Priority Data

Dec. 24, 2010  (JP) ................... 2010-286943

(51) Int. Cl.
| | | |
|---|---|---|
| G06F 7/00 | (2006.01) | |
| G06F 17/00 | (2006.01) | |
| G06F 19/00 | (2011.01) | |
| B60W 10/11 | (2012.01) | |
| B60K 23/08 | (2006.01) | |
| F16H 13/14 | (2006.01) | |
| B60W 10/06 | (2006.01) | |

(52) U.S. Cl.
CPC ............... *B60W 10/11* (2013.01); *B60K 23/08* (2013.01); *F16H 13/14* (2013.01); *B60W 10/06* (2013.01); *B60K 2023/0816* (2013.01)
USPC ............................................. 701/51

(58) Field of Classification Search
CPC ................ F16H 61/6649; F16H 2061/0087; F16H 61/66272
USPC ............................................. 701/51
See application file for complete search history.

(56) References Cited

U.S. PATENT DOCUMENTS 4,086,820 A * 5/1978 Kraus et al. ................. 476/2
4,275,610 A * 6/1981 Kraus ........................ 476/10

(Continued)

FOREIGN PATENT DOCUMENTS

| JP | 8-277896 A | 10/1996 |
|---|---|---|
| JP | 2002-349653 A | 12/2002 |

(Continued)

OTHER PUBLICATIONS

International Search Report for International application No. PCT/JP2011/074942 dated Dec. 6, 2012.

*Primary Examiner* — Thomas Tarcza
*Assistant Examiner* — Harry Oh
(74) *Attorney, Agent, or Firm* — Global IP Counselors, LLP

(57) ABSTRACT

A crankshaft is normally and reversely rotated at a constant speed, during which the singular points of crankshaft driving motor current responding to the drive torque change of the crankshaft are detected. A crankshaft rotational angle reference point is set based on the midpoint between the crankshaft rotational positions obtained when, among these singular points, singular points having the same type appear during the respective normal and reverse rotations. Therefore, the crankshaft rotational angle reference point can be reliably set regardless of the variations and errors.

16 Claims, 10 Drawing Sheets

(56) References Cited

U.S. PATENT DOCUMENTS

| | | | |
|---|---|---|---|
| 4,846,008 A * | 7/1989 | Kraus | 475/194 |
| 4,858,484 A * | 8/1989 | Kraus | 476/10 |
| 5,035,153 A * | 7/1991 | Anderson et al. | 476/8 |
| 5,419,746 A * | 5/1995 | Nakano | 476/10 |
| 6,095,940 A * | 8/2000 | Ai et al. | 475/197 |
| 6,440,030 B1 * | 8/2002 | Minegishi et al. | 475/178 |
| 7,575,535 B2 * | 8/2009 | Yamamoto | 476/42 |
| 8,657,715 B2 * | 2/2014 | Sando et al. | 475/165 |
| 8,820,193 B2 * | 9/2014 | Mori et al. | 74/665 F |
| 2002/0022546 A1 * | 2/2002 | Okoshi | 476/65 |
| 2002/0147068 A1 * | 10/2002 | Chikaraishi et al. | 476/21 |
| 2005/0143211 A1 * | 6/2005 | Yamamoto | 475/183 |
| 2005/0148422 A1 * | 7/2005 | Miller et al. | 475/217 |
| 2008/0207378 A1 * | 8/2008 | Yamamoto | 475/183 |
| 2008/0220931 A1 * | 9/2008 | Yamamoto | 476/42 |
| 2009/0312145 A1 * | 12/2009 | Pohl et al. | 477/37 |
| 2010/0292045 A1 * | 11/2010 | Mori et al. | 476/67 |
| 2010/0294613 A1 * | 11/2010 | Mori et al. | 192/75 |
| 2011/0053732 A1 * | 3/2011 | Yamamoto | 476/59 |
| 2011/0300988 A1 * | 12/2011 | Byun | 476/39 |
| 2012/0100955 A1 * | 4/2012 | Sakagami et al. | 476/61 |
| 2013/0079191 A1 * | 3/2013 | Lohr | 476/38 |
| 2013/0157803 A1 * | 6/2013 | Takaishi | 476/72 |

FOREIGN PATENT DOCUMENTS

| | | |
|---|---|---|
| JP | 2004-218711 A | 8/2004 |
| JP | 2010-091061 A | 4/2010 |

\* cited by examiner

TRACTION TRANSMISSION CAPACITY CONTROL DEVICE

CROSS-REFERENCE TO RELATED APPLICATIONS

This application is a U.S. National Stage of International Application No. PCT/JP2011/074942, filed Oct. 28, 2011. This application claims priority to Japanese Patent Application No. 2010-286943, filed on Dec. 24, 2010.

BACKGROUND

1. Field of the Invention

The present invention relates to a transmission capacity control device for a traction-transmission-type power transmission apparatus. More particularly, the invention relates to a traction transmission capacity control device in which a reference point of a traction transmission capacity control operation performed by the transmission capacity control device can be set always precisely regardless of whether or not there are manufacturing dimension errors or variations.

2. Background Information

As a power transmission apparatus, for example, a traction transmission type disclosed in Japanese Unexamined Patent Application Publication No. 2002-349653 is known. In a traction-transmission-type power transmission apparatus proposed in this Japanese Patent Publication, a first roller and a second roller are radially pressed and are brought into contact with each other, and power transmission (traction transmission) is performed due to frictional contact between these rollers.

In the above type of power transmission apparatus, traction transmission capacity control may be necessary in which the traction transmission capacity, that is, the traction transmission capacity at a portion at which the first roller and the second roller are radially pressed and are brought into contact with each other, responds to instructed transmission driving power.

Concerning this traction transmission capacity control, the above mentioned Japanese Patent Publication has proposed that a radial-direction mutual pressing force between the rollers is automatically set to be a traction transmission capacity responding to transmission torque.

SUMMARY

The above-type of traction transmission capacity control device is generally configured as follows. The second roller is rotatably supported by an eccentric shaft portion of a crankshaft, and by performing a rotation operation of the crankshaft, a radial-direction mutual pressing force between the first roller and the second roller is increased and decreased, thereby controlling the traction transmission capacity.

In this case, by revolving the second roller around the rotational axis of the crankshaft by performing a rotation operation of the crankshaft, traction transmission capacity control is performed between a non-traction transmission state and a traction-transmission-capacity maximum state. In the non-traction transmission state, the first roller and the second roller are separated from each other and traction transmission is not performed. In the traction-transmission-capacity maximum state, the first roller and the second roller approach most closely and the amount by which the two rollers overlap each other is maximized.

Accordingly, when performing traction transmission capacity control, it is necessary to understand the relationship between the control output actuating amount (the rotational angle of the crankshaft) of an actuator, which rotates the crankshaft, and control output torque of the actuator. The control output actuating amount of the actuator is an amount of actuation with respect to a reference point, which is a certain actuating position of the actuator. If this reference point is not clear, it is not possible to understand the correct relationship between the control output actuating amount and the control output torque of the actuator. As a result, traction transmission capacity control cannot be performed as intended.

Even if the above-described reference point of the actuator is clearly defined, it may be changeable due to manufacturing dimension errors or variations of traction-transmission-type power transmission apparatuses, as well as depending on the relationship between the control output actuating amount and the control output torque of the actuator.

However, in a known traction transmission capacity control technique, a typical example of which is the traction transmission capacity control technique disclosed in PTL 1, the reference point of the actuator is not clearly defined. Even if the reference point of the actuator is clearly defined, it may be changeable due to manufacturing dimension errors or variations of traction-transmission-type power transmission apparatuses, as well as depending on the relationship between the control output actuating amount and the control output torque of the actuator. Thus, in actuality, it is unlikely that traction transmission capacity control will be performed as intended.

The present invention proposes a traction transmission capacity control device for a driving power distribution apparatus, in which the above-described reference point of an actuator (the reference point of a traction transmission capacity control operation) is determined always precisely regardless of whether or not there are manufacturing dimension errors or variations of traction-transmission-type power transmission apparatuses. It is an object of the present invention to solve the above-described problems by this traction transmission capacity control device and to perform traction transmission capacity control always as intended.

In order to achieve this object, a traction transmission capacity control device of the present invention is configured as follows. First, a power transmission apparatus, which is a prerequisite of the present invention, will be explained. A power transmission apparatus performs power transmission through the use of traction transmission obtained by radial-direction mutual pressing contact between a first roller and a second roller.

A traction transmission capacity control device, which is a prerequisite of the present invention, includes second-roller revolving means for revolving the above-described second roller around an eccentric axis offset from a rotational axis of the second roller. By using this means, a radial-direction mutual pressing force exerted between the first roller and the second roller is controlled, thereby controlling a traction transmission capacity of the above-described power transmission apparatus.

In the present invention, the traction transmission capacity control device includes at least one of revolution torque detecting means and revolution speed detecting means, singular-point detecting means, and second-roller revolution operation reference point setting means, which will be described below.

The revolution torque detecting means causes the second-roller revolving means to revolve the second roller and detects revolution torque of the second roller during the revolution of the second roller. The revolution speed detecting means causes the second-roller revolving means to revolve the second roller and detects a revolution speed of the second roller during the revolution of the second roller.

The singular-point detecting means detects a singular point concerning a singular time-series change of at least one of the revolution torque and the revolution speed of the second roller detected by the revolution torque detecting means and the revolution speed detecting means, respectively. The second-roller revolution operation reference point setting means sets a revolution operation reference point of the second roller on the basis of the singular point detected by the singular-point detecting means.

Then, the traction transmission capacity control device of the present invention performs the above-described traction transmission capacity control on the basis of the set revolution operation reference point of the second roller.

In the traction transmission capacity control device of the present invention, the second-roller revolution operation reference point is set on the basis of a singular point concerning a singular time-series change of the revolution torque and/or the revolution speed of the second roller, and this reference point is used for traction transmission capacity control. Accordingly, the second-roller revolution operation reference point (the reference point of the traction transmission capacity control operation) can be determined always precisely, regardless of whether or not there are manufacturing dimension errors or variations of power transmission apparatuses or a change in operation characteristics or frictional change due to a temperature change. As a result, traction transmission capacity control can be performed always as intended.

DETAILED DESCRIPTION OF THE EMBODIMENTS

Embodiments of the present invention will be described below with reference to the accompanying drawings.

First Embodiment

Figure 1:
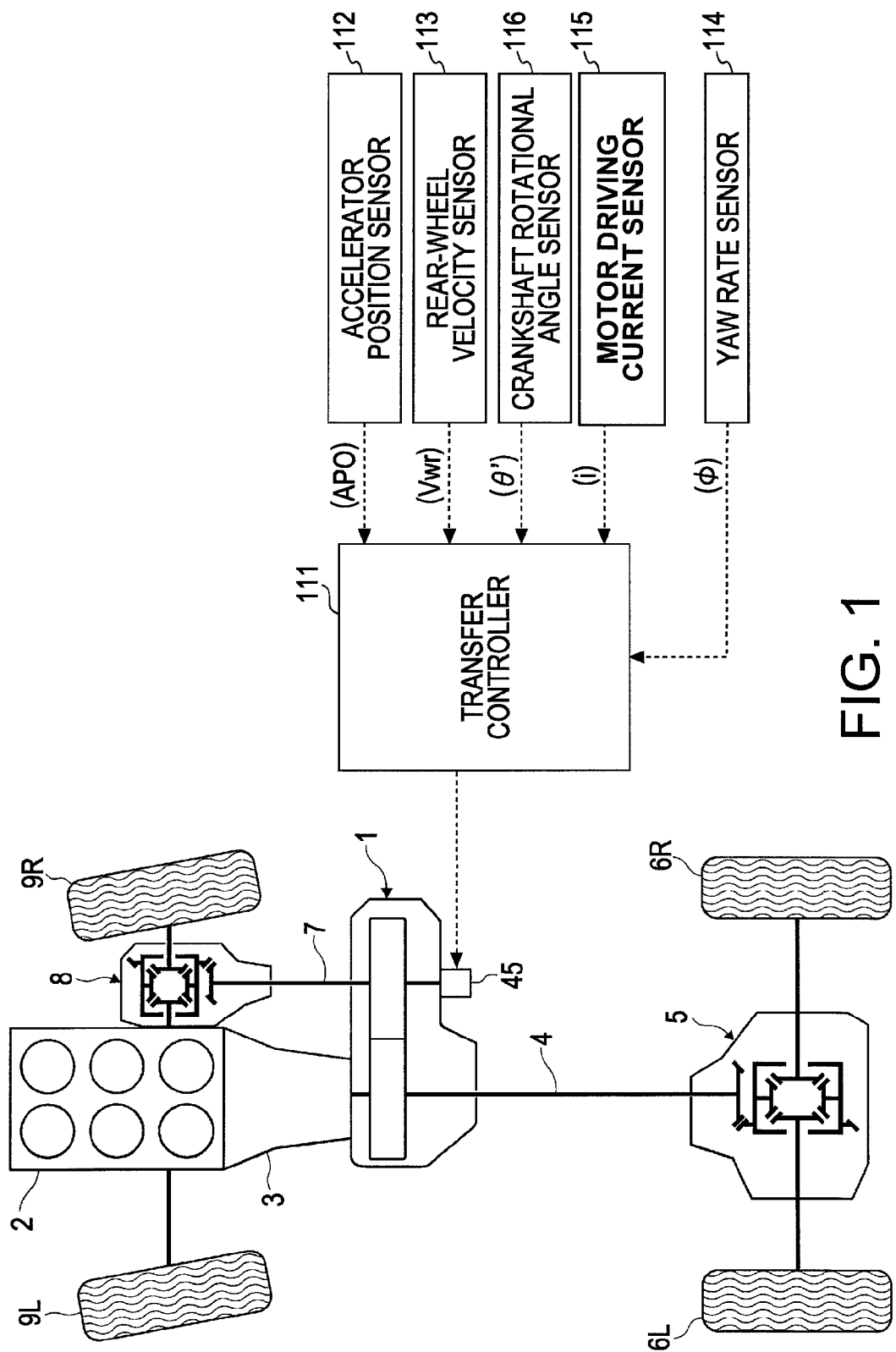
FIG. 1 is a schematic plan view, as viewed from above, illustrating a power train of a four-wheel drive vehicle including a driving power distribution apparatus, as a transfer case, having a built-in traction transmission capacity control device, which is a first embodiment of the present invention.

FIG. 1 is a schematic plan view, as viewed from above, illustrating a power train of a four-wheel drive vehicle including a driving power distribution apparatus 1, as a transfer case, having a built-in traction transmission capacity control device, which is a first embodiment of the present invention.

The four-wheel drive vehicle shown in FIG. 1 is the following type of vehicle. A rear-wheel drive car is used as a base vehicle. In the rear-wheel drive car, the rotation from an engine 2 is shifted by a transmission 3 and is then transmitted to right and left rear wheels 6R and 6L via a rear propeller shaft 4 and a rear final drive unit 5. Part of torque transmitted to the right and left rear wheels (main driving wheels) 6R and 6L is transmitted to right and left front wheels (sub driving wheels) 9R and 9L via a front propeller shaft 7 and a front final drive unit 8 by using the driving power distribution apparatus 1. With this configuration, the four-wheel drive vehicle can perform four-wheel drive running.

As stated above, the driving power distribution apparatus 1 distributes and outputs part of torque transmitted to the right and left rear wheels (main driving wheels) 6R and 6L to the right and left front wheels (sub driving wheels) 9R and 9L. Accordingly, the driving power distribution apparatus 1 determines the driving power distribution ratio between the right and left rear wheels (main driving wheels) 6R and 6L and the right and left front wheels (sub driving wheels) 9R and 9L. In this embodiment, the driving power distribution apparatus 1 is configured, as shown in FIG. 2.

Figure 2:
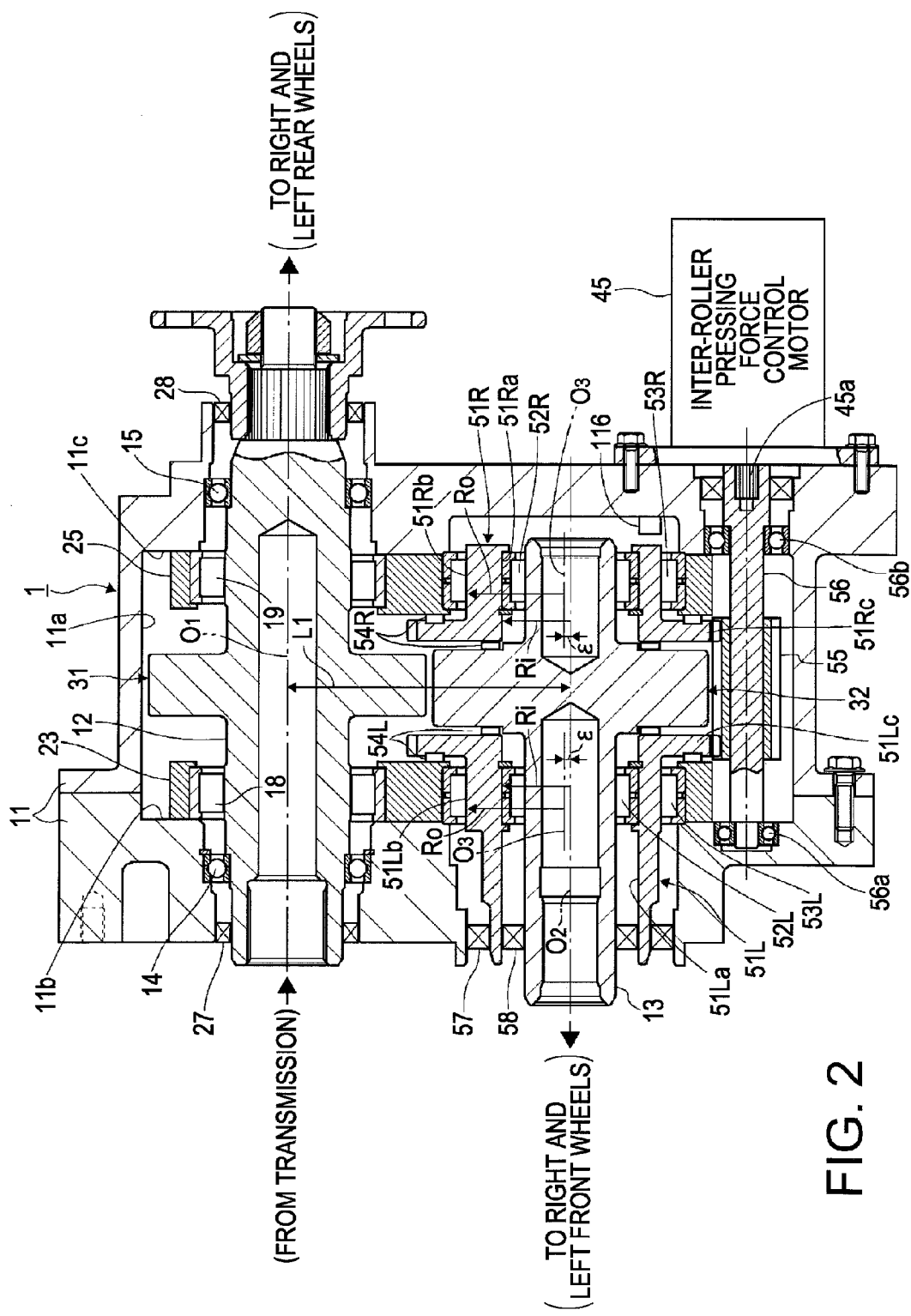
FIG. 2 is a side view of a longitudinal section of the driving power distribution apparatus shown in FIG. 1.

In FIG. 2, reference numeral 11 indicates a housing, and, in this housing 11, an input shaft 12 and an output shaft 13 are laid in parallel with each other. The input shaft 12 is supported to the housing 11 by way of ball bearings 14 and 15 disposed at both sides of the input shaft 12 such that the input shaft 12 is freely rotatable around an axis $O_1$.

The input shaft 12 is also rotatably supported by bearing supports 23 and 25 by way of roller bearings 18 and 19, respectively. Accordingly, as shown in parts (a) and (b) of FIG. 3, openings 23a and 25a into which the roller bearings 18 and 19 are respectively fitted are provided in the bearing supports 23 and 25, respectively. These bearing supports 23 and 25 serve as rotation support plates both for the input and output shafts 12 and 13, and are disposed within the housing 11 such that they are in contact with inner surfaces 11b and 11c, respectively, of the housing 11, as shown in FIG. 2. However, the bearing supports 23 and 25 are not fixed to the inner surfaces 11b and 11c, respectively, within the housing.

As shown in FIG. 2, both ends of the input shaft 12 are sealed up with a liquid by seal rings 27 and 28 and are projected from the housing 11. The left end (in the drawing) of the input shaft 12 is bonded to the output shaft of the transmission 3 (see FIG. 1) and the right end (in the drawing) of the input shaft 12 is bonded to the rear final drive unit 5 via the rear propeller shaft 4 (see FIG. 1).

Around the middle portion of the input shaft 12 in the axial direction, a first roller 31 is integrally formed concentrically with the input shaft 12. Around the middle portion of the output shaft 13 in the axial direction, a second roller 32 is integrally formed concentrically with the output shaft 13. These first roller 31 and second roller 32 are disposed in the same plane perpendicular to the axis.

With the following configuration, the output shaft 13 is indirectly rotatably supported to the housing 11. More specifically, hollow crankshafts 51R and 51L are disposed at both sides of the second roller 32 in the axial direction, which is integrally formed around the middle portion of the output shaft 13 in the axial direction, such that they are fitted to both end portions of the output shaft 13 with some play. Bearings 52R and 52L are respectively interposed between the outer peripheries of corresponding end portions of the output shaft 13 and center holes 51Ra and 51La (the radius thereof is indicated by Ri in the drawing) of these crankshafts 51R and 51L. Then, the output shaft 13 is supported within the center holes 51Ra and 51La of the crankshafts 51R and 51L, respectively, such that it is freely rotatable around a center axis $O_2$ of the center holes 51Ra and 51La, respectively.

Figure 3:
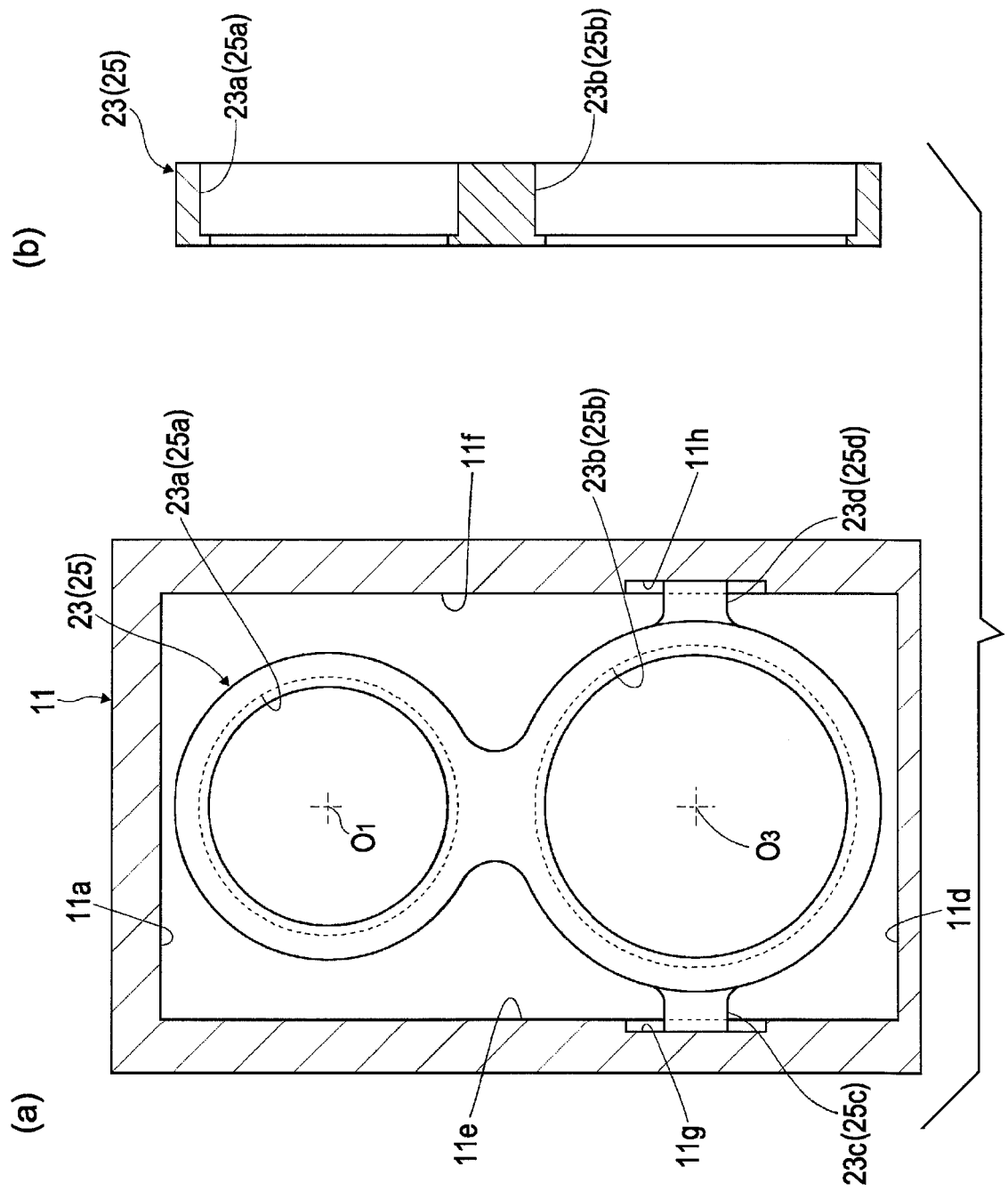
FIG. 3 illustrates a bearing support used in the driving power distribution apparatus shown in FIG. 2: part (a) is a front view of the bearing support illustrated together with a housing of the driving power distribution apparatus; and part (b) is a side view illustrating a longitudinal section of the bearing support alone.
Figure 4:
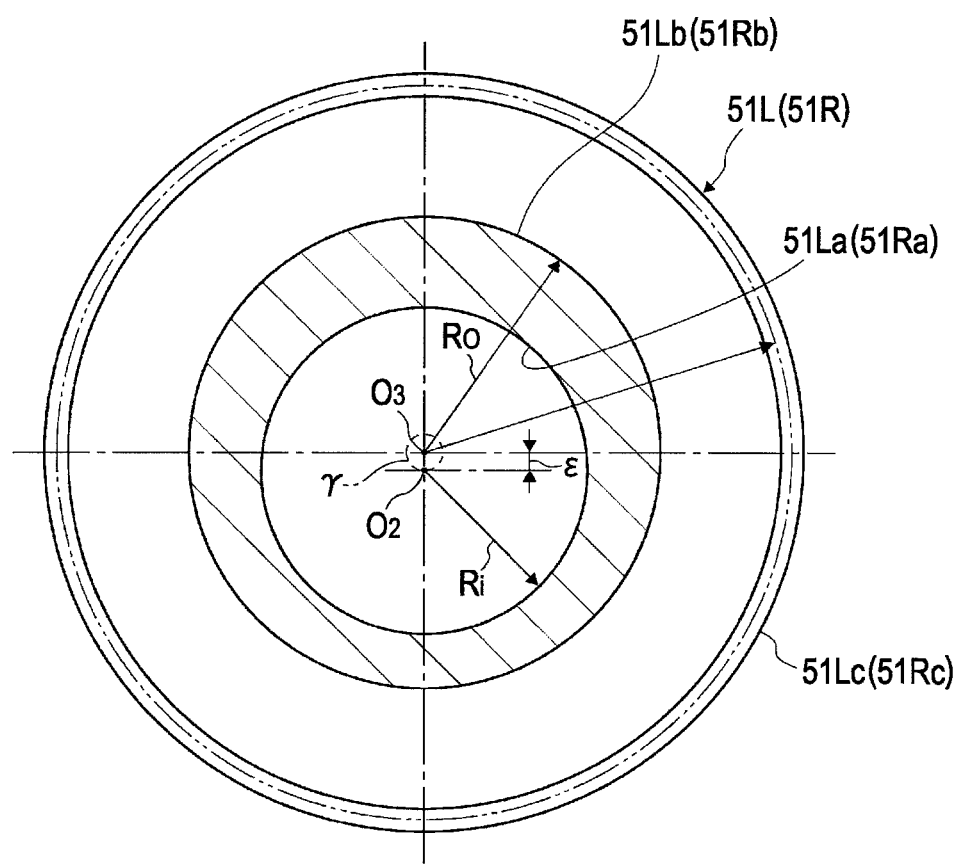
FIG. 4 is a front view of a longitudinal section of a crankshaft used in the driving power distribution apparatus shown in FIG. 2.

As is clearly seen from FIG. 4, in the crankshafts 51R and 51L, outer peripheral portions 51Rb and 51Lb (the radius thereof is indicated by Ro in the drawing) are respectively set eccentrically with respect to the center holes 51Ra and 51La (center axis $O_2$). The center axis $O_3$ of these eccentric outer peripheral portions 51Rb and 51Lb is offset from the center axis $O_2$ (the rotational axis of the second rotor 32) of the center holes 51Ra and 51La by an amount of eccentricity ε. As shown in FIG. 2, the eccentric outer peripheral portions 51Rb and 51Lb of the crankshafts 51R and 51L are respectively supported rotatably within the bearing supports 25 and 23 via corresponding bearings 53R and 53L. Accordingly, as shown in parts (a) and (b) of FIG. 3, openings 25b and 23b into which the bearings 53R and 53L, respectively, are fitted are provided in the bearing supports 25 and 23, respectively.

As stated above, the bearing supports 23 and 25 serve as rotation support plates both for the input and output shafts 12 and 13. Since the input and output shafts 12 and 13 integrally include the first roller 31 and the second roller 32, respectively, the bearing supports 23 and 25 also serve as rotation support plates both for the first roller 31 and the second roller 32. The sizes of the bearing supports 23 and 25 are formed such that, as shown in FIGS. 2 and 3, the bearing supports 23 and 25 are not in contact with an inner wall 11a of the housing 11, which is farther away from the output shaft 13 than the input shaft 12, and such that, as shown in FIG. 3, they are not in contact with an inner wall 11d of the housing 11, which is farther away from the input shaft 12 than the output shaft 13.

As shown in FIG. 3, the bearing supports 23 and 25 also respectively include projections 23c and 25c and projections 23d and 25d for preventing shaking around the axis $O_1$ of the input shaft 12 (first roller 31). These projections 23c and 25c and projections 23d and 25d are respectively abutted against the bottom surfaces of guide grooves 11g and 11h provided on inner surfaces 11e and 11f of the housing. As shown in part (a) of FIG. 3, the guide grooves 11g and 11h are formed in a narrow shape in the direction of a tangent line of the openings 23b and 25b provided in the bearing supports 23 and 25, respectively, so that the displacement of the projections 23c, 23d, 25c and 25d in the direction of the tangent line is not restricted.

The crankshafts 51R and 51L, which are rotatably supported by the bearing supports 25 and 23, respectively, as stated above, are positioned in the axial direction, together with the second roller 32, between the bearing supports 25 and 23, as shown in FIG. 2, by using thrust bearings 54R and 54L, respectively.

As shown in FIG. 2, at adjacent ends at which the crankshafts 51R and 51L oppose each other, ring gears 51Rc and 51Lc which are concentric with the eccentric outer peripheral portions 51Rb and 51Lb, respectively, are integrally formed with the eccentric outer peripheral portions 51Rb and 51Lb, respectively. These ring gears 51Rc and 51Lc are formed with the same specifications. A crankshaft driving pinion 55 used both for the ring gears 51Rc and 51Lc is engaged with the ring gears 51Rc and 51Lc. The engagement of the crankshaft driving pinion 55 is performed as follows. In the synchronizing state in which the crankshafts 51R and 51L are rotated and located at a position at which the eccentric outer peripheral portions 51Rb and 51Lb are aligned in the circumferential direction, the crankshaft driving pinion 55 is engaged with the ring gears 51Rc and 51Lc.

The crankshaft driving pinion 55 is bonded to a pinion shaft 56, and both ends of the pinion shaft 56 are rotatably supported to the housing 11 by bearings 56a and 56b. At the right side of FIG. 2, the right end of the pinion shaft 56 is sealed up with a liquid and is exposed to the outside of the housing 11. An output shaft 45a of an inter-roller pressing force control motor 45 attached to the housing 11 is driven and bonded to the exposed end surface of the pinion shaft 56 by way of serration-insertion.

When controlling the rotation position of the crankshafts 51R and 51L via the pinion 55 and the ring gears 51Rc and 51Lc by using the inter-roller pressing force control motor 45, the rotational axis $O_2$ of the output shaft 13 and the second roller 32 revolves along a locus circle γ indicated by the broken line in FIG. 4. Accordingly, the inter-roller pressing force control motor 45, the pinion 55, the ring gears 51Rc and 51Lc, and the crankshafts 51R and 51L form second-roller revolving means of the present invention.

Figure 5:
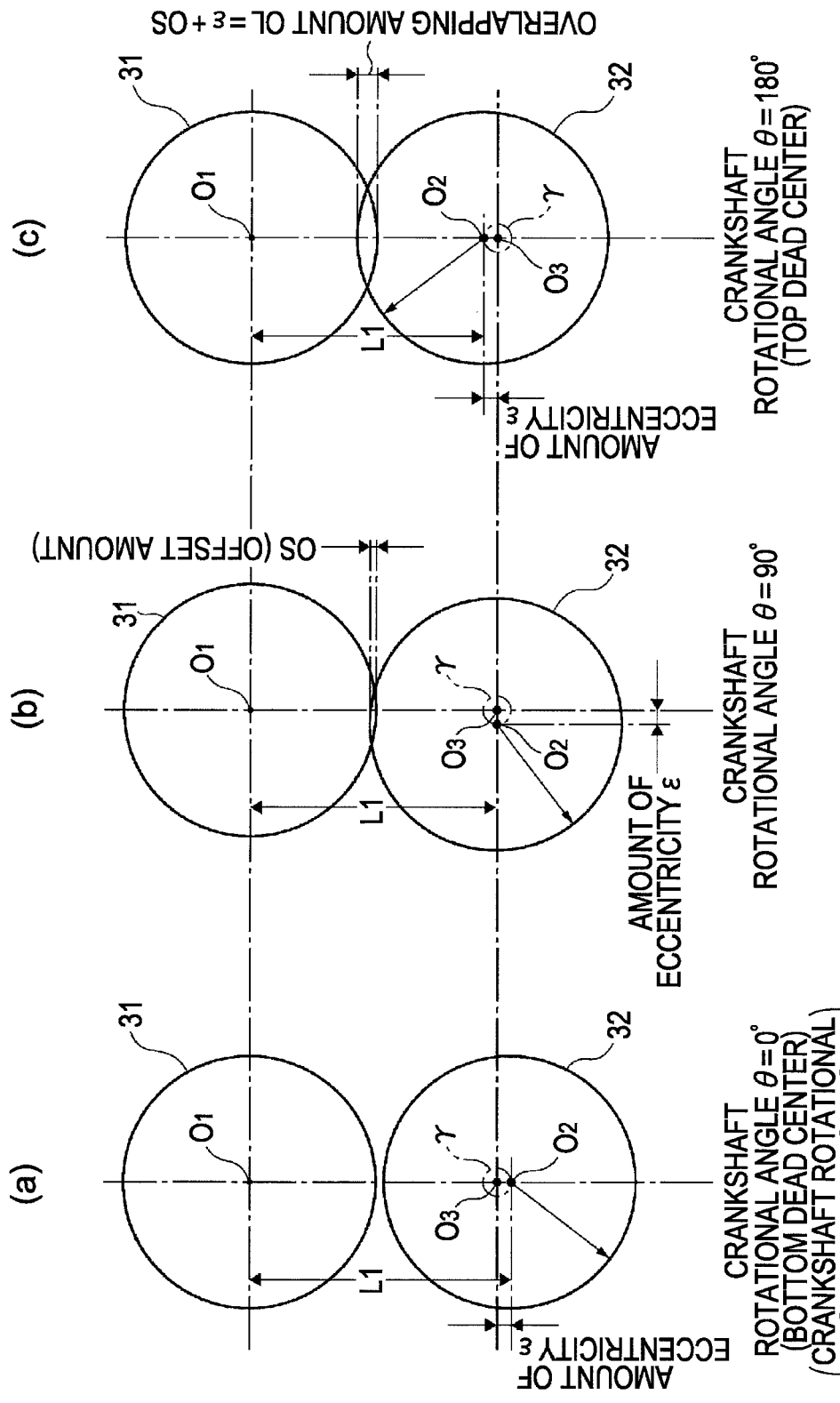
FIG. 5 shows operation diagrams of the driving power distribution apparatus shown in FIG. 2: part (a) is an operation diagram illustrating a separation state of a first roller and a second roller at a position at which the crankshaft rotational angle is 0°; part (b) is an operation diagram illustrating a contact state of the first roller and the second roller at a position at which the crankshaft rotational angle is 90°; and part (c) is an operation diagram illustrating a contact state of the first roller and the second roller at a position at which the crankshaft rotational angle is 180°.

Because of the revolution of the rotational axis $O_2$ (second roller 32) along the locus circle γ shown in FIG. 4, the second roller 32 approaches the first roller 31 in the radial direction, as shown in parts (a) through (c) of FIG. 5. In this case, as the rotational angle θ of the crankshafts 51R and 51L increases, the inter-roller-axis distance L1 (see also FIG. 2) between the first roller 31 and the second roller 32 becomes smaller than the sum of the radius of the first roller 31 and the radius of the second roller 32. Due to a decrease in the inter-roller-axis distance L1, the radial-direction pressing force (inter-roller transmission torque capacity) of the second roller 32 with respect to the first roller 31 is increased. Accordingly, the inter-roller radial-direction pressing force (inter-roller transmission torque capacity) can be controlled as desired in accordance with the degree by which the inter-roller-axis distance L1 is decreased.

In this embodiment, as shown in part (a) of FIG. 5, the inter-roller-axis distance L1 at the bottom dead center at which the second-roller rotational axis $O_2$ is positioned immediately below the crankshaft rotational axis $O_3$ and the inter-axis distance between the first roller 31 and the second roller 32 is maximized is set to be greater than the sum of the radius of the first roller 31 and the radius of the second roller 32. With this setting, at the bottom dead center at which the rotational angle θ of the crankshafts is 0°, the following state is obtained. The first roller 31 and the second roller 32 do not press against each other in the radial direction, and traction transmission is not performed between the rollers 31 and 32, i.e., the traction transmission capacity is 0. The traction transmission capacity can be controlled as desired in a range from 0 at the bottom dead center to the maximum value obtained at the top dead center (θ=180°) shown in part (c) of FIG. 5.

In this embodiment, in actuality, the reference point of the rotational angle of the crankshafts 51R and 51L is set. Then, the crankshaft rotational angle θ at this reference point is set to be 0°, and the amount of rotation from this reference point is set to be θ. This will be discussed in detail later. However, before the outline of setting of the reference point of the crankshaft rotational angle is discussed, for the sake of description, a description will be given, assuming that the reference point of the crankshaft rotational angle is the bottom dead center.

The crankshaft 51L and the output shaft 13 are projected from the housing 11 at the left side of FIG. 2, and at these projecting portions, a seal ring 57 is interposed between the housing 11 and the crank shaft 51L, and a seal ring 58 is interposed between the crankshaft 51L and the output shaft 13. By way of these seal rings 57 and 58, the projecting portions of the crankshaft 51L and the output shaft 13 projecting from the housing 11 are sealed up with a liquid.

When interposing the seal rings 57 and 58, at the end portion of the crankshaft 51L at which these seal rings 57 and 58 will be positioned, the centers of the inner diameter and the outer diameter of the crankshaft 51L are displaced from each other, as in the support positions of the output shaft 13. The seal ring 57 is interposed between the outer diameter of the above-described end portion of the crankshaft 51L and the housing 11, and the seal ring 58 is interposed between the inner diameter of the above-described end portion of the crankshaft 51L and the output shaft 13. With such a sealing structure, although the rotational axis $O_2$ revolves and is displaced as a result of the revolution of the output shaft 13 and the second roller 32, the sealing condition of the output shaft 13 can be maintained at the portion at which the output shaft 13 projects from the housing 11.

The driving power distribution of the embodiment shown in FIGS. 1 through 5 will be discussed below. On one hand, torque which has reached the input shaft 12 of the driving power distribution apparatus 1 from the transmission 3 (see FIG. 1) directly passes through the rear propeller shaft 4 and the rear final drive unit 5 (see FIG. 1) sequentially and is transmitted to the right and left rear wheels 6R and 6L (main driving wheels), thereby driving the right and left rear wheels 6R and 6L.

On the other hand, the driving power distribution apparatus 1 of this embodiment controls the rotation positions of the crankshafts 51R and 51L via the pinion 55 and the ring gears 51Rc and 51Lc by using the inter-roller pressing force control motor 45 so that the inter-roller-axis distance L1 will become smaller than the sum of the radius of the first roller 31 and the radius of the second roller 32, thereby pressing and contacting the rollers 31 and 32 each other in the radial direction. In this case, the rollers 31 and 32 have an inter-roller transmission torque capacity corresponding to the radial-direction mutual pressing force. In accordance with this torque capacity, part of the torque to be transmitted to the right and left rear wheels 6R and 6L (main driving wheels) can be directed to the output shaft 13 via the first roller 31 and the second roller 32.

It is noted that the radial-direction pressing counterforce between the first roller 31 and the second roller 32 during the transmission of torque is received by the bearing supports 23 and 25, which serve as rotation support plates both for the first and second rollers 31 and 32, and is not transmitted to the housing 11. Accordingly, it is not necessary to form the housing 11 strong enough to resist the radial-direction pressing counterforce, and thus, it does not cause any problem in terms of the weight and the cost.

Then, the torque is transmitted from the left side of the output shaft 13 in FIG. 2 to the right and left front wheels (sub driving wheels) 9R and 9L via the front propeller shaft 7 (see FIG. 1) and the front final drive unit 8 (see FIG. 1), thereby driving the right and left front wheels 9R and 9L. In this manner, the vehicle can perform four-wheel drive running by driving all the right and left rear wheels 6R and 6L (main driving wheels) and right and left front wheels 9R and 9L (sub driving wheels).

When performing the above-described four-wheel drive running, if the rotational angle θ of the crankshafts 51R and 51L is 90°, as shown in part (b) of FIG. 5, and if the first roller 31 and the second roller 32 are in the frictional connection state in which they press against each other with a radial-direction pressing force corresponding to the offset amount OS, power is transmitted to the right and left front wheels (sub driving wheels) 9R and 9L with the traction transmission capacity corresponding to the offset amount OS between the rollers 31 and 32.

Then, the crankshaft rotational angle θ is increased by rotating the crankshafts 51R and 51L from the rotation position at which θ=90°, as shown in part (b) of FIG. 5, toward the top dead center at which the crankshaft rotational angle θ=180°, as shown in part (c) of FIG. 5. In this case, the inter-roller-axis distance L1 is further decreased and the overlapping amount OL of the first roller 31 and the second roller 32 is increased. As a result, the radial-direction mutual pressing force between the first roller 31 and the second roller 32 is increased, thereby making it possible to increase the traction transmission capacity between these rollers 31 and 32.

When the crankshafts 51R and 51L have reached the top dead center (θ=180°), as shown in FIG. 5C, the first roller 31 and the second roller 32 press against each other in the radial direction with the radial-direction maximum pressing force corresponding to the maximum overlapping amount OL, thereby making it possible to maximize the traction transmission capacity between these rollers 31 and 32. The maximum overlapping amount OL is equal to the sum of the amount of eccentricity ε between the second-roller rotational axis $O_2$ and the crankshaft rotational axis $O_3$ and the above-described offset amount OS shown in part (b) of FIG. 5.

As is seen from the foregoing description, by rotating the crankshafts 51R and 51L from the rotation position at which the crankshaft rotational angle θ=0° to the rotation position at which the crankshaft rotational angle θ=180°, as the crankshaft rotational angle θ is increased, the inter-roller traction transmission capacity can be sequentially changed from 0 to the maximum value. Conversely, by rotating the crankshafts 51R and 51L from the rotation position at which the crankshaft rotational angle θ=180° to the rotation position at which the crankshaft rotational angle θ=0°, as the crankshaft rotational angle θ is decreased, the inter-roller traction transmission capacity can be sequentially changed from the maximum value to 0. It is thus possible to control the inter-roller traction transmission capacity as desired by the rotation operation of the crankshafts 51R and 51L.

Figure 6:
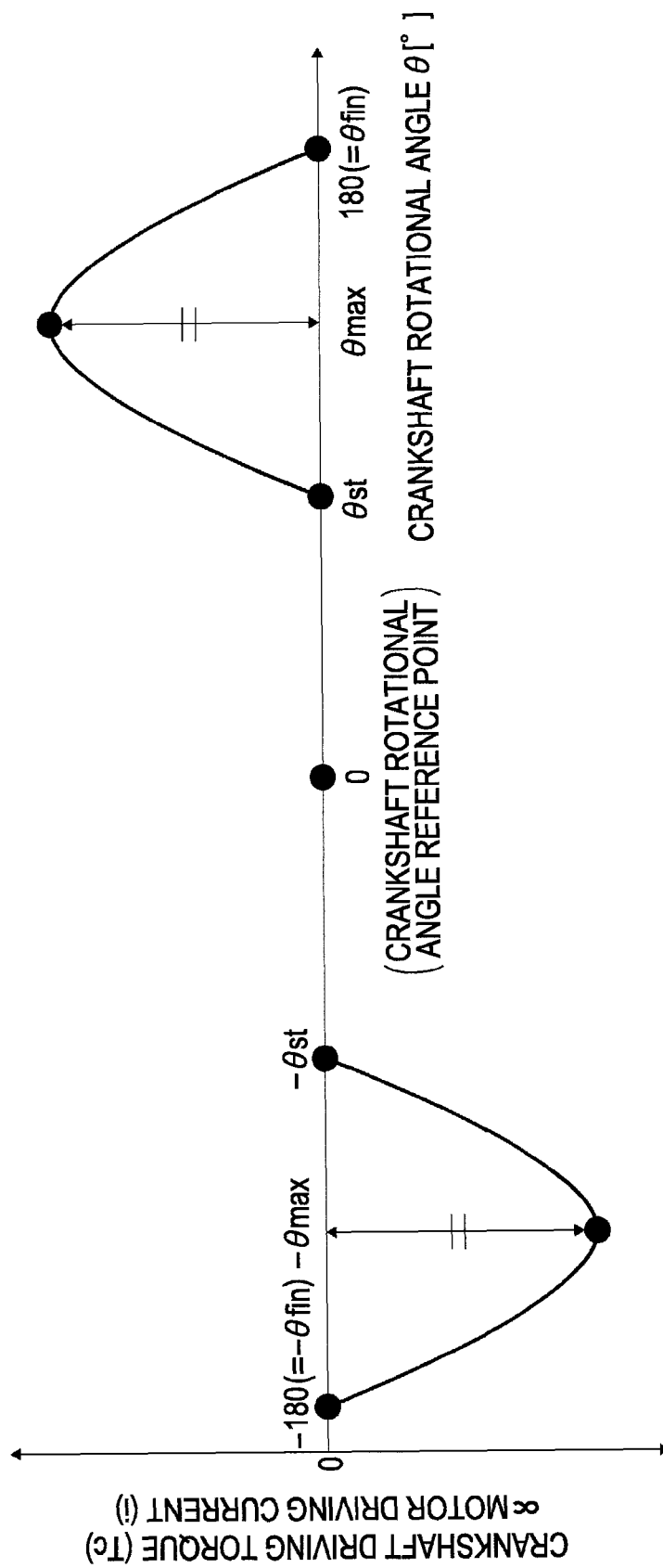
FIG. 6 is a characteristic diagram illustrating variation characteristics of crankshaft driving torque with respect to the crankshaft rotational angle of the driving power distribution apparatus shown in FIG. 2.

FIG. 6 illustrates variation characteristics of driving torque Tc of the crankshafts 51R and 51L (proportional to a driving current i of the motor 45) when the crankshafts 51R and 51L are rotated from the reference point of the crankshaft rotational angle at which the crankshaft rotational angle θ=0° to the rotation position at which the crankshaft rotational angle θ=180° (θfin), or when the crankshafts 51R and 51L are reversely rotated from the reference point of the crankshaft rotational angle at which the crankshaft rotational angle θ=0° to the rotation position at which the crankshaft rotational angle θ=−180° (−θfin).

Regardless of the direction in which the crankshafts 51R and 51L are rotated, the crankshaft driving torque Tc (motor driving current i) is generated when the crankshaft rotational angle θ=±θst at which the first roller 31 and the second roller 32 start to contact each other, and the crankshaft driving torque Tc (motor driving current i) is maximized when the crankshaft rotational angle θ=±θmax. Thereafter, the crankshaft driving torque Tc is gradually decreased and becomes 0 when the crankshaft rotational angle θ=±θfin.

For performing the above-described traction transmission capacity control, in this embodiment, a transfer controller 111 is provided, as shown in FIG. 1, thereby performing rotation control of the inter-roller pressing force control motor 45 (control of the crankshaft rotational angle θ). The following signals are input into the transfer controller 111; a signal from an accelerator position sensor 112 for detecting an accelerator position APO (the degree of depression of an accelerator pedal), which increases or decreases the output from the engine 2; a signal from a rear-wheel velocity sensor 113 for detecting the rotation peripheral velocity Vwr of the right and left rear wheels 6R and 6L (main driving wheels); a signal from a yaw rate sensor 114 for detecting the yaw rate φ around the vertical axis passing through the center of the gravity of a vehicle; and a signal from a motor driving current sensor 115 for detecting a driving current i of the inter-roller pressing force control motor 45 from the transfer controller 111. Additionally, a signal from a crankshaft rotational angle sensor 116 which is disposed within the housing 111, as shown in FIG. 2, and which detects the actual rotational angle θ' of the crankshafts 51R and 51L is also input into the transfer controller 111.

On the basis of these items of input information, the transfer controller 111 determines the driving power of the right and left rear wheels 6R and 6L (main driving wheels) and the target front-and-rear-wheel driving power distribution ratio, and then calculates the target front-wheel driving power to be distributed to the right and left front wheels (sub driving wheels) 9R and 9L from the right-and-left rear-wheel driving power and the target front-and-rear-wheel driving power distribution ratio. Then, the transfer controller 111 determines the target crankshaft rotational angle so that the traction transmission capacity between the first roller 31 and the second roller 32 may be associated with the above-described target front-wheel driving power. The transfer controller 111 then controls the rotation of the inter-roller pressing force control motor 45 so that the actual rotational angle θ' of the crankshafts 51R and 51L will be equal to this target crankshaft rotational angle.

The control of the rotational angle (θ) of the crankshafts 51L and 51R by using the inter-roller pressing force control motor 45 can be implemented by performing control so that the crankshaft rotational angle θ from a certain reference point of the rotational angle of the crankshafts 51L and 51R will be equal to the above-described target crankshaft rotational angle. If the reference point of the rotational angle of the crankshafts 51L and 51R (the reference point of the traction transmission capacity control operation) is not clear, it is not possible to understand the correct relationship between the crankshaft rotational angle θ and the crankshaft driving torque Tc (motor torque), which varies depending on this reference point. As a result, the above-described traction transmission capacity control cannot be performed as intended.

Additionally, even if the above-described reference point of the rotational angle of the crankshafts 51L and 51R is clearly defined, it may be changeable due to manufacturing dimension errors or variations of driving power distribution apparatuses. As a result, traction transmission capacity control cannot be performed precisely.

In this embodiment, by always precisely obtaining the above-described reference point of the crankshaft rotational angle regardless of whether or not there are manufacturing dimension errors or variations of driving power distribution apparatuses, the above-described traction transmission capacity control can be performed always as intended.

Figure 7:
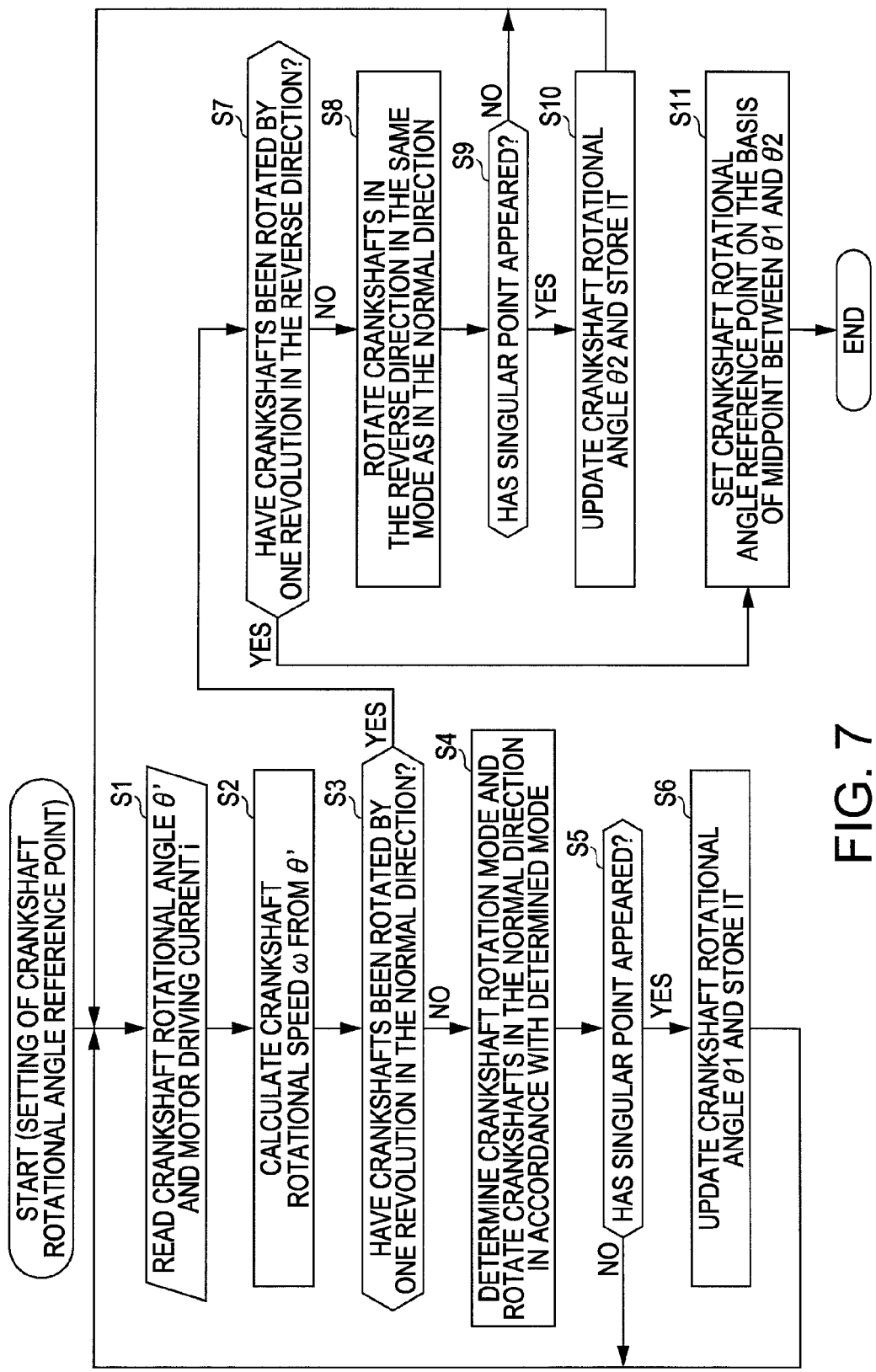
FIG. 7 is a flowchart illustrating a program for setting a crankshaft rotational angle reference point, to be executed by a transfer controller shown in FIG. 1 when performing driving power distribution control.

Accordingly, when performing the above-described traction transmission capacity control, the transfer controller 111 determines the reference point of the crankshaft rotational angle by executing a control program shown in FIG. 7, and then performs the above-described traction transmission capacity control on the basis of this reference point. The control program shown in FIG. 7 is repeatedly executed by regular interrupts, at intervals, for example, every 5 msec, so that a delay will not occur in response to responsiveness of the inter-roller radial-direction pressing force control motor 45.

In step S1, the motor driving current i detected by the motor driving current sensor 115 and the actual crankshaft rotational angle θ' detected by the crankshaft rotational angle sensor 116 are read. The motor driving current i represents information indicating the crankshaft driving torque Tc (second-roller revolution torque). Accordingly, step S1 corresponds to revolution torque detecting means of the present invention.

In step S2, the crankshaft rotational speed ω is calculated on the basis of the crankshaft rotational angle θ' detected in step S1. The crankshaft rotational speed ω is the second-roller revolution speed itself. Accordingly, step S2 corresponds to revolution speed detecting means of the present invention. The crankshaft rotational speed ω may be calculated by dividing, the difference between the currently read value of the crankshaft rotational angle θ' (step S1) and the previous value (memory value) which was read one calculation interval before, by one calculation interval (5 msec), or by performing filtering processing for allowing the crankshaft rotational angle θ' to pass through a high-pass filter.

In step S3, it is checked from the crankshaft rotational angle θ' whether the crankshafts 51L and 51R have been rotated by one revolution in the normal direction, as shown in parts (b) and (c) of FIG. 5. If it is determined in step S3 that the crankshafts 51L and 51R have not yet been rotated by one revolution in the normal direction, control proceeds to step S4 in which the crankshafts 51L and 51R are rotated by one revolution in the normal direction.

That is, in step S4, a motor driving current i is supplied to the motor 45, and the crankshafts 51R and 51L are driven to rotate in the normal direction, as shown in parts (b) and (c) of FIG. 5, by this motor 45, thereby revolving the second roller 32 in the same direction (normal direction).

When rotating the crankshafts 51R and 51L in the normal direction (revolving the second roller 32 in the same direction) in step S4, there may be the following three modes in which this rotation (revolution) is performed: (1) a first mode in which the crankshafts 51R and 51L are rotated at a constant speed; (2) a second mode in which, in response to an instruction to output a constant level of torque, the crankshafts 51R and 51L are rotated with the instructed constant level of torque; and (3) a third mode in which, although an instruction to output a constant level of torque has been given, the crankshafts 51R and 51L are rotated in the state in which the instructed constant level of torque is not output due to the influence of a reverse voltage. Thus, in step S4, one of these modes is selected and determined, and then, the above-described crankshafts 51R and 51L are rotated in the normal direction (the second roller 32 revolves in the same direction) in accordance with the determined mode. The crankshafts 51R and 51L are used for revolving the second roller 32. Accordingly, step S4 corresponds to second-roller constant-speed revolving means and second-roller constant-force revolving means of the present invention.

The first mode "the crankshafts 51R and 51L are rotated at a constant speed" can be implemented as follows. For example, an angle servo system is used in which control is performed so that the crankshaft rotational angle θ' will follow an instructed crankshaft rotational angle value which changes at a constant speed. Then, an instructed motor driving current value obtained as a result of the angle servo system performing control is supplied to the motor 45 by the transfer controller 111, thereby driving the motor 45. The second mode "in response to an instruction to output a constant level of torque, the crankshafts 51R and 51L are rotated with the instructed constant level of torque", or the third mode "although an instruction to output a constant level of torque has been given, the crankshafts 51R and 51L are rotated in the state in which the instructed constant level of torque is not output due to the influence of a reverse voltage" can be implemented as follows. A certain instructed motor driving current value is supplied to the motor 45 without using the transfer controller 111, thereby driving the motor 45.

In step S5, it is checked whether a singular time-series change (hereinafter referred to as a "singular point") concerning the motor driving current i read in step S1 or the crankshaft rotational speed ω calculated in step S2 has appeared. Accordingly, step S5 corresponds to singular-point detecting means of the present invention.

It is now assumed that the motor driving power supply voltage is indicated by V, the resistance is indicated by R, and the reverse voltage constant (=torque constant) is indicated by Ke. Then, the following relationship between the motor driving current i and the crankshaft rotational speed ω for which a singular point will be detected is found.

$$i=(V-Ke\times\omega)/R$$

As the singular points concerning the motor driving current i and the crankshaft rotational speed ω, the following singular points are found for each of the above-described rotation (revolution) modes (first through third modes).

Figure 8:
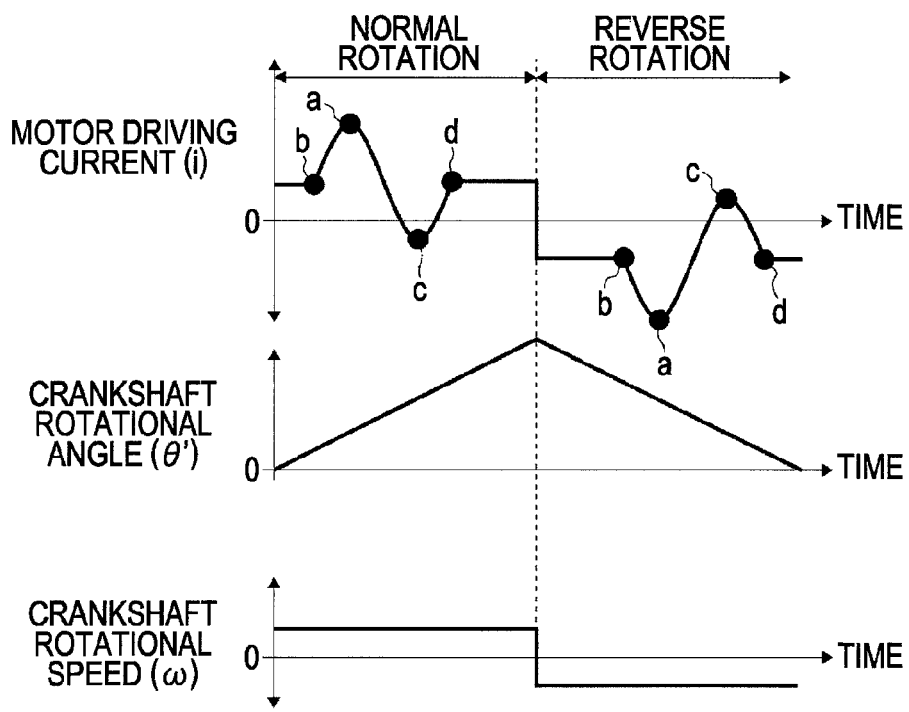
FIG. 8 is an operation time chart when the crankshaft rotational angle reference point is set by rotating a crankshaft at a constant speed by using the control program shown in FIG. 7.

In the case of (1) the first mode "the crankshafts 51R and 51L are rotated at a constant speed", the crankshaft rotational speed ω is maintained at a constant value, as indicated in the normal-rotation region shown in FIG. 8, and thus, the following singular points (a), (b), (c), and (d) responding to a change in the driving torque of the crankshafts 51R and 51L appear in the motor driving current i:

(a) a singular point at which the motor driving current i rises to a maximum value in response to the fact that the crankshaft normal-rotation driving torque rises to a maximum value;

(b) a singular point at which the motor driving current i starts to increase in response to the fact that the crankshaft normal-rotation driving torque starts to rise;

(c) a singular point at which the motor driving current i shifts from a decrease to an increase in response to a shift of the crankshaft normal-rotation driving torque from a decrease to an increase; and (d) a singular point at which the motor driving current i stops decreasing in response to the fact that the crankshaft normal-rotation driving torque is reduced to 0.

Figure 9:
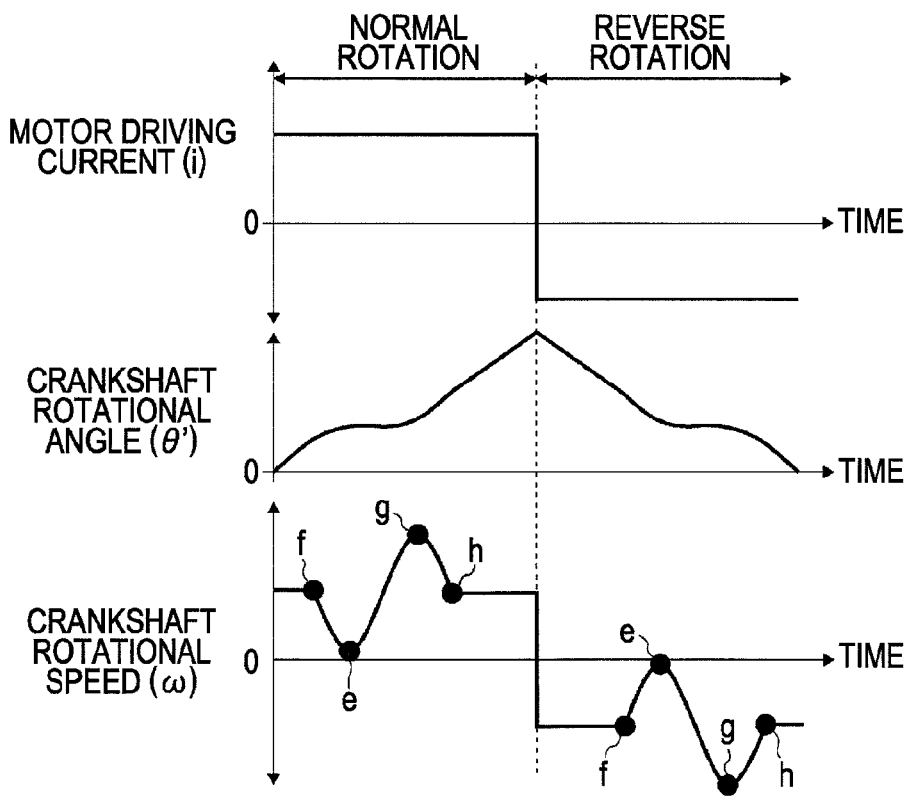
FIG. 9 is an operation time chart when the crankshaft rotational angle reference point is set by rotating a crankshaft at a constant force by using the control program shown in FIG. 7.

In the case of (2) the second mode "in response to an instruction to output a constant level of torque, the crankshafts 51R and 51L are rotated with the instructed constant level of torque", the driving torque of the crankshafts 51R and 51L is maintained at a constant value in response to a constant motor driving current i, as indicated in the normal-rotation region shown in FIG. 9, and thus, the following singular points (e), (g), and (h) caused by a change in the crankshaft driving load appear in the crankshaft rotational speed ω:

(e) a singular point at which the crankshaft rotational speed ω is decreased to a minimum value in response to the fact that the crankshaft driving load is increased to a maximum value;

(f) a singular point at which the crankshaft rotational speed ω starts to decrease in response to the fact that the crankshaft driving load starts to rise;

(g) a singular point at which the crankshaft rotational speed ω shifts from an increase to a decrease in response to a shift of the crankshaft driving load from a decrease to an increase; and (h) a singular point at which the crankshaft rotational speed ω stops increasing in response to the fact that the crankshaft driving load is reduced to 0.

Figure 10:
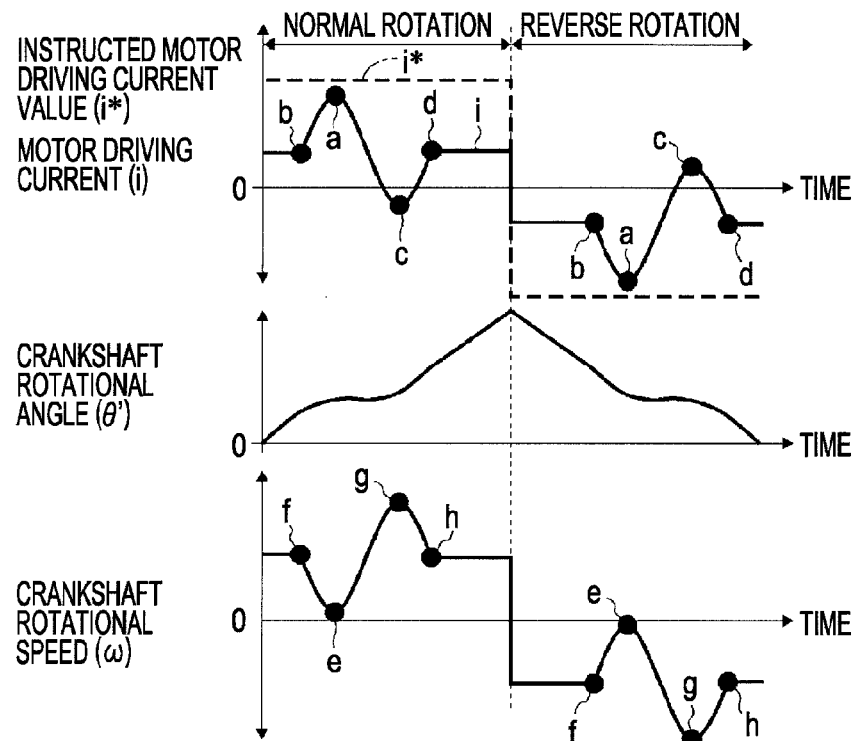
FIG. 10 is an operation time chart when the crankshaft rotational angle reference point is set in the state in which an expected level of torque is not output due to a counter electromotive force although an attempt has been made to rotate a crankshaft at a constant force by using the control program shown in FIG. 7.

In the case of (3) the third mode "although an instruction to output a constant level of torque has been given, the crankshafts 51R and 51L are rotated in the state in which the instructed constant level of torque is not output due to the influence of a reverse voltage", although an instruction to output a constant level of torque has been given through the use of an instructed constant motor driving current value i*, motor torque corresponding to the instructed motor driving current value i* is not obtained due to a reverse voltage, as indicated in the normal-rotation region shown in FIG. 10. Accordingly, the crankshafts 51R and 51L are rotated with a smaller level of torque than the motor torque corresponding to the instructed motor driving current value i*. Thus, the following singular points (a), (b), (c), and (d) responding to a change in the driving torque of the crankshafts 51R and 51L appear in the motor driving current i, and the following singular points (e), (f), (g), and (h) responding to a change in the crankshaft driving load appear in the crankshaft rotational speed ω:

(a) a singular point at which the motor driving current i rises to a maximum value in response to the fact that the crankshaft normal-rotation driving torque rises to a maximum value;

(b) a singular point at which the motor driving current i starts to increase in response to the fact that the crankshaft normal-rotation driving torque starts to rise;

(c) a singular point at which the motor driving current i shifts from a decrease to an increase in response to a shift of the crankshaft normal-rotation driving torque from a decrease to an increase; and (d) a singular point at which the motor driving current i stops decreasing in response to the fact that the crankshaft normal-rotation driving torque is reduced to 0;

(e) a singular point at which the crankshaft rotational speed ω is decreased to a minimum value in response to the fact that the crankshaft driving load is increased to a maximum value;

(f) a singular point at which the crankshaft rotational speed ω starts to decrease in response to the fact that the crankshaft driving load starts to rise;

(g) a singular point at which the crankshaft rotational speed ω shifts from an increase to a decrease in response to a shift of the crankshaft driving load from a decrease to an increase; and (h) a singular point at which the crankshaft rotational speed ω stops increasing in response to the fact that the crankshaft driving load is reduced to 0.

Until it is checked in step S5 that the above-described singular points (a) through (h) have appeared, control returns to step S1, and the loop of steps S1 through S5 is repeated until these singular points have appeared. If it is checked that the singular points (a) through (h) have appeared in step S5, control proceeds to step S6. In step S6, the detected crankshaft rotational angle value θ' when a certain singular point selected from among these singular points (a) through (h) has appeared is updated as θ1 and is stored.

If it is determined in step S3 that the crankshafts 51L and 51R have been rotated by one revolution in the normal direction, as shown in parts (b) and (c) of FIG. 5, control proceeds to step S7 and subsequent steps in which the crankshafts 51L and 51R are rotated in the reverse direction, and the appearances of singular points during this reverse rotation similar to those described above are checked. To execute these steps, it is first checked in step S7, on the basis of the crankshaft rotational angle θ' whether the crankshafts 51L and 51R have been rotated in the reverse direction from the position at which the crankshafts 51L and 51R have been rotated in the normal direction by one revolution.

It if is determined in step S7 that the crankshafts 51L and 51R have not yet been rotated in the reverse direction, control proceeds to step S8 in which the crankshafts 51L and 51R are rotated in the reverse direction by one revolution. That is, in step S8, a motor driving current i is supplied to the motor 45. Then, the motor 45 drives the crankshafts 51L and 51R to rotate in the reverse direction from the position at which the crankshafts 51L and 51R have been rotated in the normal direction, thereby revolving the second roller 32 in the same direction (reverse direction) and returning the second roller 32 to the same position at which the normal rotation was started. Among the above-described modes (1) through (3), the mode in which the rotation (revolution) in the reverse direction is performed is the same mode as that when the rotation (revolution) in the normal direction was performed.

In step S9, it is checked whether or not a singular point concerning the motor driving current i or the crankshaft rotational speed a has appeared during the reverse direction. During the reverse direction, too, singular points (a) through (h) similar to those appeared during the normal direction appear, as indicated in the reverse-rotation regions shown in FIGS. 8 through 10 (however, in the explanation of the above-described individual singular points, "normal" has to be read as "reverse"). In step S9, the appearances of the singular points (a) through (h) in the reverse-rotation regions in FIGS. 8 through 10 are checked.

Until it is checked in step S9 that the above-described singular points (a) through (h) have appeared during the reverse direction, control returns to step S1, and the loop of steps S1 through S3 and steps S7 through S9 is repeated until these singular points have appeared. If the appearances of the singular points (a) through (h) during the reverse direction have been checked in step S9, control proceeds to step S10. In step S10, the detected crankshaft rotational angle value θ' when the same type (same symbol) of certain singular point as the singular point selected in step S6, among the singular points (a) through (h), has appeared during the reverse direction is updated as θ2 and is stored.

If it is determined in step S7 that the crankshafts 51L and 51R have been rotated in the reverse direction by one revolution, control proceeds to step S11. In step S11, on the basis of the midpoint between the crankshaft rotational angles θ1 and θ2, which are stored in steps S6 and S10, respectively, when the same type (same symbol) of singular point during the normal direction and the reverse direction has appeared, the crankshaft rotational angle reference point illustrated in part (a) of FIG. 5 is set. Accordingly, step S11 corresponds to crankshaft rotational angle reference point setting means of the present invention.

In setting the crankshaft rotational angle reference point, when θ>θ2, the midpoint between θ1 and θ2 is set to be 0° when the crankshaft rotational angle reference point is 0°. In this case, the crankshaft rotational angle θ with respect to the crankshaft rotational angle reference point is expressed by the following equation.

$$\theta = \theta' + \{\theta - (\theta 1 + \theta 2)/2\})$$

Conversely, when θ1<θ2, the midpoint between θ1 and θ2 is set to be a point rotated by 180° with respect to the reference point when the crankshaft rotational angle reference point is 0°. In this case, the crankshaft rotational angle θ with respect to the crankshaft rotational angle reference point is expressed by the following equation.

$$\theta = \theta' + \{180 - (\theta 1 + \theta 2)/2\})$$

That is, in the first embodiment, as is seen from the foregoing description, the crankshaft rotational angle reference point is set as follows. The crankshafts 51R and 51L are rotated in the normal direction by one revolution by using the motor 45, thereby revolving the second roller 32 in the same direction (normal direction) by one revolution. Then, the crankshaft rotational angle θ1 when one of the singular points (a) through (h) concerning the motor driving current i or the crankshaft rotational speed ω has appeared during the revolution of the second roller 32 is detected. Thereafter, the crankshafts 51R and 51L are driven to rotate in the reverse direction by one revolution by using the motor 45, thereby revolving the second roller 32 in the same direction (reverse direction) and returning to the original position. Then, the crankshaft rotational angle θ2 when the same type (symbol) of singular point concerning the motor driving current i or the crankshaft rotational speed ω has appeared during the revolution of the second roller 32 is detected. The crankshaft rotational angle reference point is determined from the midpoint between these crankshaft rotational angles θ1 and θ2.

The transfer controller 111 shown in FIG. 1 sets the crankshaft rotational angle reference point which has been set described above as the crankshaft rotation operation reference point (the crankshaft rotational angle θ=0) shown in part (a) of FIG. 5, and performs the above-described traction transmission capacity control on the basis of the crankshaft rotational angle θ from this crankshaft rotation operation reference point.

The traction transmission capacity control device for the driving power distribution apparatus according to the above-described first embodiment performs traction transmission capacity control for the driving power distribution apparatus in the following manner. The motor 45 causes the second roller 32 to revolve in the normal and reverse directions through the crankshafts 51R and 51L, and the crankshaft rotational angles θ1 and θ2 (second-roller revolution position) when one of the singular points (a) through (h) concerning the motor driving current i or the crankshaft rotational speed ω has appeared during the revolution of the second roller 32 are detected. Then, the crankshaft rotational angle reference point (second-roller revolution operation reference point) is determined from the midpoint between the crankshaft rotational angles θ1 and θ2 (second-roller revolution position). Then, on the basis of the amount by which the second roller 32 revolves from this crankshaft rotational angle reference point (second-roller revolution operation reference point), traction transmission capacity control for the driving power distribution apparatus is performed.

Accordingly, the crankshaft rotational angle reference point (second-roller revolution operation reference point), i.e., the reference point of the traction transmission capacity control operation can be determined always precisely, regardless of whether there are manufacturing dimension errors or variations of driving power distribution apparatuses or a change in operation characteristics or frictional change due to a temperature change. As a result, traction transmission capacity control can be performed always as intended.

Additionally, in this embodiment, the motor 45 causes the second roller 32 to revolve at a constant speed through the crankshafts 51R and 51L, and the singular points (a), (b), (c), and (d) concerning the crankshaft driving torque (second-roller revolution torque) appeared during the revolution of the second roller 32 are detected. Then, based on these singular points, the above-described crankshaft rotational angle reference point (second-roller revolution operation reference point) is set. Thus, by merely monitoring a time-series change in the crankshaft driving torque (second-roller revolution torque), the above-described singular points (a), (b), (c), and (d) can be simply and easily detected.

Moreover, the value of the crankshaft driving torque (second-roller revolution torque) itself does not influence the appearances of the above-described singular points (a), (b), (c), and (d). Accordingly, it is not necessary to correct for inertia which influences the value of the crankshaft driving torque (second-roller revolution torque), thereby improving the precision in setting the crankshaft rotational angle reference point (second-roller revolution operation reference point). Thus, the above-described advantages can be made more conspicuous.

In this embodiment, the motor 45 causes the second roller 32 to revolve at a constant level of torque through the crankshafts 51R and 51L, and the singular points (e), (f), (g), and (h) concerning the crankshaft rotational speed ω (second-roller revolution speed) appeared during the revolution of the second roller 32 are detected. Then, based on these singular points, the above-described crankshaft rotational angle reference point (second-roller revolution operation reference point) is set. Thus, by merely monitoring a time-series change in the crankshaft rotational speed ω (second-roller revolution speed), the above-described singular points (e), (f), (g), and (h) can be simply and easily detected.

Moreover, by applying a large level of the above-described torque to the crankshafts 51R and 51L (second roller 32) from the motor 45, the rotation of the crankshafts 51R and 51L (second roller 32) can be speedily completed, and as a result, the detection of the singular points (e), (f), (g), and (h) can be speedily performed. Thus, the above-described advantages can be made more conspicuous.

Additionally, in a case in which an instructed level of torque cannot be obtained due to the generation of a reverse voltage corresponding to the rotational speed in the motor 45, as the crankshaft driving torque increases, the revolution speed decreases. In this case, if the revolution speed is decreased, the reverse voltage is reduced and the driving torque is increased. Accordingly, as discussed with reference to FIG. 10, both of the singular points (a), (b), (c), and (d) concerning the crankshaft driving torque (second-roller revolution torque) and the singular points (e), (f), (g), and (h) concerning the crankshaft rotational speed ω (second-roller revolution speed) appear. Thus, the latitude to select the singular points is advantageously increased.

Second Embodiment

Figure 11:
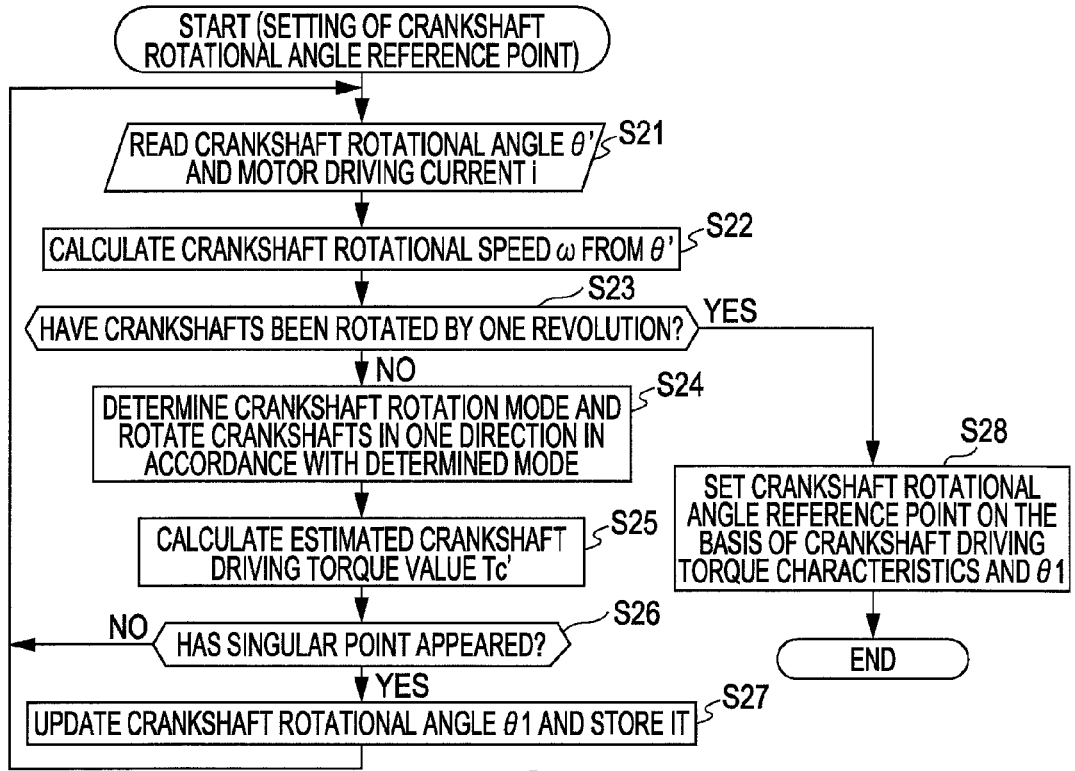
FIG. 11 is a flowchart corresponding to the flowchart of FIG. 7, illustrating a control program used when a traction capacity control device of a second embodiment of the present invention sets a crankshaft rotational angle reference point.

FIG. 11 illustrates a control program used when a traction capacity control device, which is a second embodiment of the present invention, sets a crankshaft rotational angle reference point. In this embodiment, too, a driving power distribution apparatus similar to that shown in FIGS. 1 through 6 is used, and when performing the above-described traction transmission capacity control, the transfer controller 111 shown in FIG. 1 determines the crankshaft rotational angle reference point by executing the control program shown in FIG. 11, and based on this reference point, the transfer controller 111 performs the above-described traction transmission capacity control.

The control program shown in FIG. 11 is repeatedly executed by regular interrupts, at intervals, for example, every 5 msec, so that a delay will not occur in response to responsiveness of the inter-roller radial-direction pressing force control motor 45. In step S21, the motor driving current i detected by the motor driving current sensor 115 and the actual crankshaft rotational angle θ' detected by the crankshaft rotational angle sensor 116 are read. Then, in step S22, the crankshaft rotational speed ω is calculated on the basis of the crankshaft rotational angle θ' detected in step S21.

In step S23, it is checked on the basis of the crankshaft rotational angle θ' whether the crankshafts 51L and 51R have been rotated by one revolution in a certain direction. If it is determined in step S23 that the crankshafts 51L and 51R have not yet been rotated by one revolution, control proceeds to step S24 in which the crankshafts 51L and 51R are rotated. That is, in step S24, from among the above-described modes (1) through (3) of the first embodiment, a certain mode is selected, and in accordance with the selected mode, a motor driving current i is supplied to the motor 45, and the crankshafts 51R and 51L are driven to rotate in the above-described direction by this motor 45, thereby revolving the second roller 32 in the same direction.

Then, in step S25, if resistance torque for inertia or hydraulic fluid viscosity is large and if it is necessary to make correction for such resistance torque, the correction amount of torque is calculated and the estimated crankshaft driving torque value Tc' is calculated.

As the calculation method for the estimated crankshaft driving torque value Tc', the following two methods are possible.

(1) From the motor torque Tm=(K×i) obtained by multiplying the motor driving current i by the torque constant K, inertia torque (J×α) and viscosity torque (D×ω) are subtracted. The inertia torque (J×α) and viscosity torque (D×ω) are obtained by using inertia J, viscosity D, which have been obtained in advance, the crankshaft rotational speed ω calculated in step S22, and the crankshaft rotational acceleration α calculated based on this crankshaft rotational speed ω. Then, the estimated crankshaft driving torque value Tc' is calculated from this subtraction result. The crankshaft rotational acceleration α may be calculated by dividing, the difference between the current value of the crankshaft rotational speed ω and the previous value calculated one control interval before, by one control interval, or by allowing the crankshaft rotational speed ω to pass through a high-pass filter.

(2) In order to eliminate noise caused by the calculation of the crankshaft rotational speed ω or the crankshaft rotational acceleration α, a disturbance observer is used in which filtering processing is performed by allowing the estimated crankshaft driving torque value Tc' calculated in the above-described method (1) to pass through a low-pass filter. Then, the final estimated crankshaft driving torque value Tc' is determined.

Then, in step S26, by performing checking similar to step S5 of FIG. 7, it is checked whether a singular time-series change (singular point) concerning the motor driving current i read in step S21 or the crankshaft rotational speed ω calculated in step S22 has appeared. However, if the correction in step S25 has been performed, checking is performed to find whether singular points corresponding to the above-described singular points (a) through (d) have appeared in the estimated crankshaft driving torque value Tc' calculated in step S25 instead of in the motor driving current i.

Figure 12:
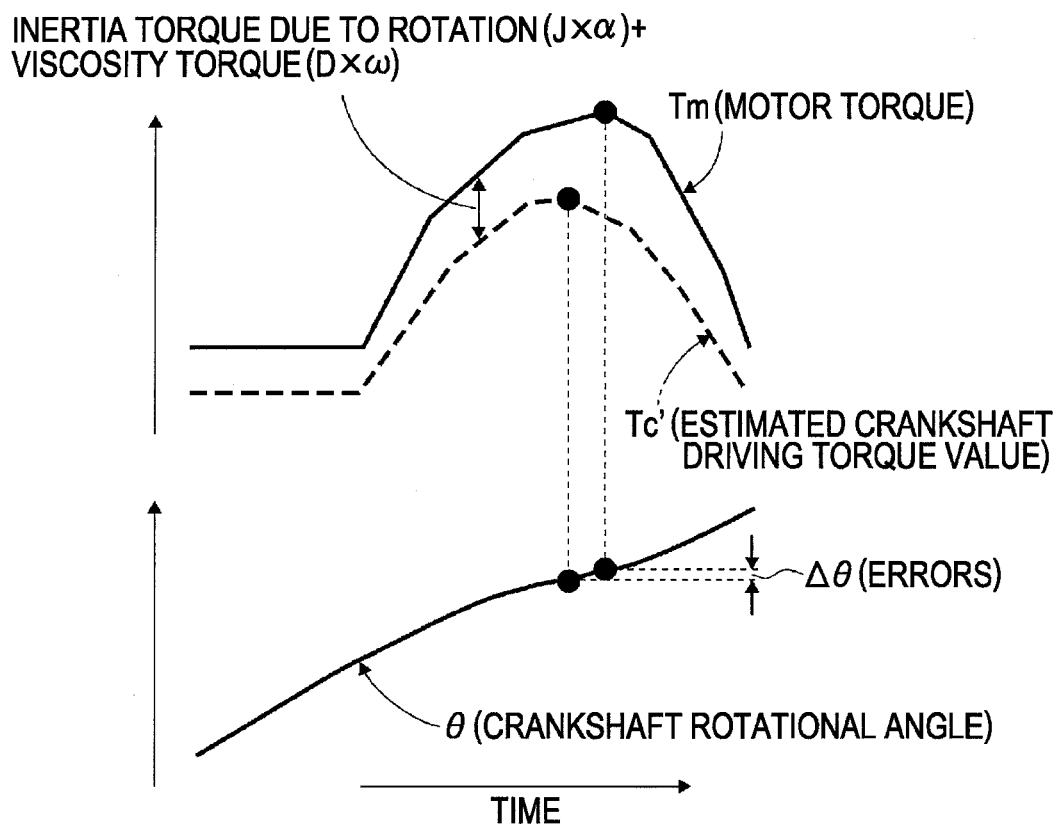
FIG. 12 is a chart illustrating, in comparison with a time-series change in actual torque of a motor for driving a crankshaft, a time-series change in an estimated crankshaft driving torque value used when the crankshaft rotational angle reference point is set by rotating a crankshaft by one revolution in one direction by using the control program shown in FIG. 11.

The reason why the singular points concerning the estimated crankshaft driving torque value Tc' instead of those concerning the motor driving current i are checked is as follows. FIG. 12 illustrates, together with a time-series change in the crankshaft rotational angle θ, a time-series change in the estimated crankshaft driving torque value Tc' calculated by subtracting the inertia torque (J×α) and the viscosity torque (D×ω) from the motor torque Tm. As is seen from this drawing, an error Δθ occurs between the crankshaft rotational angle θ when the motor torque Tm is increased to a maximum value and the crankshaft rotational angle θ when the estimated crankshaft driving torque value Tc' is increased to a maximum value. By using the estimated crankshaft driving torque value Tc' instead of the motor driving current i, the crankshaft rotational angle reference point can be set with higher precision. Accordingly, in this embodiment, instead of singular points of the motor driving current i, singular points of the estimated crankshaft driving torque value Tc' are detected.

Until it is checked in step S26 that the singular points have appeared, control returns to step S21, and the loop of steps S21 through S26 is repeated until these singular points have appeared. If it is checked that the singular points have appeared in step S26, control proceeds to step S27. In step S27, the detected crankshaft rotational angle value θ' when the final singular point has appeared is updated as θ1 and is stored.

If it is determined in step S23 that the crankshafts 51L and 51R have been rotated by one revolution in the above-described direction, control proceeds to step S28. In step S28, the crankshaft rotational angle reference point is set from the crankshaft driving characteristics (variation characteristics of crankshaft driving torque Tc with respect to the crankshaft rotational angle θ) shown in FIG. 6 and the crankshaft rotational angle θ1 when the final singular point has been detected in step S26.

More specifically, since the crankshaft rotational angle θ1 when the final singular point has been detected in step S26 coincides with the crankshaft rotational angle θ at which the same type of singular point appears on the crankshaft driving characteristics shown in FIG. 6, the same crankshaft rotational angle is set as the crankshaft rotational angle reference point θ0. In this case, the crankshaft rotational angle θ with respect to the crankshaft rotational angle reference point is expressed by the following equation.

$$\theta = \theta' + (\theta 0 - \theta 1)$$

The crankshaft rotational angle reference point θ0 takes the following values according to the combinations of the above-described crankshaft rotation modes (1) through (3) and the singular points (a) through (h). In the case of the combination of (1)+(a), the combination of (2)+(e), the combination of (3)+(a), and the combination of (3)+(d), the crankshaft rotational angle reference point θ0 is θ0=θmax. In the case of the combination of (1)+(b), the combination of (2)+(f), the combination of (3)+(b), and the combination of (3)+(f), the crankshaft rotational angle reference point θ0 is θ0=θst. In the case of the combination of (1)+(c), the combination of (2)+(g), the combination of (3)+(c), and the combination of (3)+(g), the crankshaft rotational angle reference point θ0 is θ0=−θmax. In the case of the combination of (1)+(d), the combination of (2)+(h), the combination of (3)+(d), and the combination of (3)+(h), the crankshaft rotational angle reference point θ0 is θ0=θfin.

The transfer controller 111 shown in FIG. 1 sets the crankshaft rotational angle reference point θ0 which has been set described above as the crankshaft rotation operation reference point of the crankshaft rotational angle θ=0 and performs the above-described traction transmission capacity control on the basis of the crankshaft rotational angle θ with respect to this crankshaft rotation operation reference point θ0.

The traction transmission capacity control device for the driving power distribution apparatus according to the above-described second embodiment performs traction transmission capacity control for the driving power distribution apparatus in the following manner. The motor 45 causes the second roller 32 to revolve in one direction through the crankshafts 51R and 51L, and the crankshaft rotational angle θ1 (second-roller revolution position) when one of the singular points (a) through (h) concerning the motor driving current i or the crankshaft rotational speed ω has appeared during the revolution of the second roller 32 is detected. From this crankshaft rotational angle θ1 (second-roller revolution position) and the crankshaft rotational angle at which the same type of singular point appears on the crankshaft driving characteristics shown in FIG. 6, the crankshaft rotational angle reference point θ0 (second-roller revolution operation reference point) is determined. Then, on the basis of the amount by which the second roller 32 revolves from this crankshaft rotational angle reference point θ0 (second-roller revolution operation reference point), traction transmission capacity control for the driving power distribution apparatus is performed. Accordingly, the crankshaft rotational angle reference point θ0 (second-roller revolution operation reference point), i.e., the reference point of the traction transmission capacity control operation, can be determined always precisely, regardless of whether there are manufacturing dimension errors or variations of driving power distribution apparatuses, or a change in operation characteristics or frictional change due to a temperature change. As a result, traction transmission capacity control can be performed always as intended, and thus, advantages similar to those of the first embodiment can be achieved.

Additionally, in this embodiment, when revolving the second roller 32 by using the motor 45 through the crankshafts 51R and 51L, it is sufficient that the second roller 32 is revolved only in one direction. Thus, the setting of the crankshaft rotational angle reference point θ0 (second-roller revolution operation reference point) can be performed in a short period of time, thereby enhancing the responsiveness of traction transmission capacity control.

Moreover, in this embodiment, if, due to a large level of resistance torque for inertia or hydraulic fluid viscosity, the motor driving current i (motor torque Tm) representing the crankshaft driving torque does not indicate the actual crankshaft driving torque, singular points concerning the motor driving current i are not used for determining the crankshaft rotational angle reference point $\theta 0$ (second-roller revolution operation reference point). Instead, as discussed in step S25, the crankshaft rotational angle reference point $\theta 0$ (second-roller revolution operation reference point) is determined from the crankshaft rotational angle $\theta 1$ (second-roller revolution position) when a singular point of the estimated crankshaft driving torque value Tc' has appeared, and from the crankshaft rotational angle at which the same type of singular point appears on the crankshaft driving characteristics shown in FIG. 6. The estimated crankshaft driving torque value Tc' is calculated by subtracting the inertia torque (J×α) and the viscosity torque (D×ω) from the motor torque Tm=(K×i). Thus, even under the condition that there is a large level of resistance torque for inertia (J×α) and the resistance torque for viscosity (D×ω), the crankshaft rotational angle reference point $\theta 0$ (second-roller revolution operation reference point) can be set precisely, and the above-described advantages can be reliably obtained even under such environments.

Other Embodiments

In both of the above-described first embodiment and second embodiment, when revolving the second roller 32 through the crankshafts 51R and 51L by using the motor 45, the second roller 32 is revolved around 360°. However, the crankshaft driving torque (motor torque) may be restricted and set to be stopped when a singular point appears when the rotation of the crankshafts 51R and 51L (revolution of the second roller 32) is smaller than 360°, and on the basis of information concerning the crankshaft rotational angle when the crankshaft driving torque has stopped, the crankshaft rotational angle reference point may be set.

In this case, however, the rotation stalling torque of the crankshafts 51R and 51L (revolution stalling torque of the second roller 32) varies due to variations or deterioration of parts or a viscosity or frictional change caused by a temperature change. Accordingly, the following problems will occur. If the crankshaft driving torque (motor torque) restricted as described above is too small, the crankshafts 51R and 51L do not rotate. Conversely, if the crankshaft driving torque (motor torque) is too large, the crankshafts 51R and 51L continuously rotate without stopping. In this manner, it takes a long time to find a suitable level of torque to be restricted, and thus, the time until the crankshaft rotational angle reference point is set is increased.

Particularly, if a torque diode is interposed between the motor 45 and the crankshafts 51R and 51L, the following problems will occur. If the setting of a crankshaft rotational angle reference point is started in the vicinity of the counter-force maximum angle and then the crankshafts 51R and 51L start to rotate with operating torque, they are continuously rotated without stopping. Moreover, if the unlocking torque of the torque diode is large, the crankshafts 51R and 51L cannot be reversely rotated with a constant level of torque, thereby failing to set a crankshaft rotational angle reference point.

As in the above-described first embodiment and second embodiment, if the second roller 32 is revolved around 360° through the crankshafts 51R and 51L by using the motor 45, the above-described problems will not occur, and the crankshaft rotational angle reference point can be set with high precision. In this point, too, the above-described first embodiment and second embodiment can advantageously enjoy the superiority.

In both of the above-described first and second embodiments, the traction transmission capacity control device is used for control of the front-and-rear-wheel power distribution of the transfer case 1. However, the traction transmission capacity control device of the present invention is not restricted to this purpose of use, and can be used for traction transmission capacity control of all types of traction-transmission-type power transmission apparatuses. In such a case, functions and advantages similar to those described above can be certainly achieved.

The invention claimed is:

1. A traction transmission capacity control device used for a power transmission apparatus that performs power transmission through use of traction transmission obtained by radial-direction mutual pressing contact between a first roller and a second roller, in which a traction transmission capacity of the power transmission apparatus is controlled as a result of a second-roller revolving member controlling a radial-direction mutual pressing force exerted between the first roller and the second roller, the second-roller revolving member revolving the second roller around an eccentric axis offset from a rotational axis of the second roller, the traction transmission capacity control device comprising:
   a controller including
     at least one of a revolution torque detecting section programmed to cause the second-roller revolving member to revolve the second roller and to determine revolution torque of the second roller during the revolution of the second roller, and a revolution speed detecting section programmed to causes the second-roller revolving member to revolve the second roller and to determine a revolution speed of the second roller during the revolution of the second roller;
     a singular-point detecting section programmed to determine a singular point concerning a singular time-series change of at least one of the revolution torque detected by the revolution torque detecting section and the revolution speed of the second roller detected by the revolution speed detecting section; and
     a second-roller revolution operation reference point setting section programmed to set a revolution operation reference point of the second roller based on the singular point detected by the singular-point detecting section,
   the controller being programmed to perform the traction transmission capacity control using the revolution operation reference point of the second roller set by the second-roller revolution operation reference point setting section.

2. The traction transmission capacity control device according to claim 1, wherein
   the singular-point detecting section is further programmed to determine a first singular point of the revolution torque and/or the revolution speed detected by the revolution torque detecting section and/or the revolution speed detecting section during the revolution of the second roller in a first direction, and to determine a second singular point of the revolution torque and/or the revolution speed detected by the revolution torque detecting section and/or the revolution speed detecting section during the revolution of the second roller in a second direction; and the second-roller revolution operation reference point setting section is further programmed to set the revolution operation reference point of the second roller based on a midpoint between a rotation position of the second roller at a time when the first singular point of the revolution torque and/or the revolution speed is detected during the revolution of the second roller in the first direction and a rotation position of the second roller at a time when the second singular point of the revolution torque and/or the revolution speed is detected during the revolution of the second roller in the second direction.

3. The traction transmission capacity control device according to claim 1, wherein the singular-point detecting section detects a singular point of the revolution torque and/or the revolution speed detected by the revolution torque detecting section and/or the revolution speed detecting section during the revolution of the second roller by one revolution; and the second-roller revolution operation reference point setting section sets the revolution operation reference point of the second roller based on a rotation position of the second roller at a time when a singular point of the revolution torque and/or the revolution speed is detected during the revolution of the second roller by one revolution and a rotation position of the second roller at a position at which the same type of singular point exists in a relationship between the rotation position of the second roller and the revolution torque and/or the revolution speed, the relationship being obtained in advance.

4. The traction transmission capacity control device according to claim 3, wherein the singular-point detecting section detects a singular point of corrected revolution torque obtained by subtracting inertia torque and viscosity torque from the revolution torque detected by the revolution torque detecting section during the revolution of the second roller by one revolution.

5. The traction transmission capacity control device according to claim 1, wherein the power transmission apparatus is positioned such that the first roller is rotated together with a rotating member forming a torque transmission path to main driving wheels and such that the second roller is rotated together with a rotating member forming a torque transmission path to sub driving wheels, and the power transmission apparatus is used for a driving power distribution apparatus that distributes driving power between the main driving wheels and the sub driving wheels; and the traction transmission capacity control device performs the traction transmission capacity control on the basis of an amount by which the second roller is revolved by using the second-roller revolving section from the second-roller revolution operation reference point set by the second-roller revolution operation reference point setting section, thereby making it possible to control the distribution of driving power between the main driving wheels and the sub driving wheels.

6. The traction transmission capacity control device according to claim 2, wherein the power transmission apparatus is positioned such that the first roller is rotated together with a rotating member forming a torque transmission path to main driving wheels and such that the second roller is rotated together with a rotating member forming a torque transmission path to sub driving wheels, and the power transmission apparatus is used for a driving power distribution apparatus that distributes driving power between the main driving wheels and the sub driving wheels; and the traction transmission capacity control device performs the traction transmission capacity control on the basis of an amount by which the second roller is revolved by using the second-roller revolving section from the second-roller revolution operation reference point set by the second-roller revolution operation reference point setting section, thereby making it possible to control the distribution of driving power between the main driving wheels and the sub driving wheels.

7. The traction transmission capacity control device according to claim 3, wherein the power transmission apparatus is positioned such that the first roller is rotated together with a rotating member forming a torque transmission path to main driving wheels and such that the second roller is rotated together with a rotating member forming a torque transmission path to sub driving wheels, and the power transmission apparatus is used for a driving power distribution apparatus that distributes driving power between the main driving wheels and the sub driving wheels; and the traction transmission capacity control device performs the traction transmission capacity control on the basis of an amount by which the second roller is revolved by using the second-roller revolving section from the second-roller revolution operation reference point set by the second-roller revolution operation reference point setting section, thereby making it possible to control the distribution of driving power between the main driving wheels and the sub driving wheels.

8. The traction transmission capacity control device according to claim 4, wherein the power transmission apparatus is positioned such that the first roller is rotated together with a rotating member forming a torque transmission path to main driving wheels and such that the second roller is rotated together with a rotating member forming a torque transmission path to sub driving wheels, and the power transmission apparatus is used for a driving power distribution apparatus that distributes driving power between the main driving wheels and the sub driving wheels; and the traction transmission capacity control device performs the traction transmission capacity control on the basis of an amount by which the second roller is revolved by using the second-roller revolving section from the second-roller revolution operation reference point set by the second-roller revolution operation reference point setting section, thereby making it possible to control the distribution of driving power between the main driving wheels and the sub driving wheels.

9. A traction transmission capacity control device used for a power transmission apparatus that performs power transmission through use of traction transmission obtained by radial-direction mutual pressing contact between a first roller and a second roller, in which a traction transmission capacity of the power transmission apparatus is controlled as a result of a second-roller revolving member controlling a radial-direction mutual pressing force exerted between the first roller and the second roller, the second-roller revolving member revolving the second roller around an eccentric axis offset from a rotational axis of the second roller, the traction transmission capacity control device comprising:

a controller including
a revolution torque detecting section programmed to determine revolution torque of the second roller during the revolution of the second roller;
a second-roller constant-speed revolving section programmed to causes the second-roller revolving member to revolve the second roller at a constant speed and to determine a revolution speed of the second roller during the revolution of the second roller;
a singular-point detecting section programmed to determine a singular point concerning a singular time-series change of the revolution torque of the second roller detected by the revolution torque detecting section while the second roller is revolving at a constant speed by using the second-roller constant-speed revolving section; and
a second-roller revolution operation reference point setting section programmed to set a revolution operation reference point of the second roller based on of the singular point of the revolution torque of the second roller detected by the singular-point detecting section while the second roller is revolving at a constant speed,
the controller being programmed to perform the traction transmission capacity control using the revolution operation reference point of the second roller set by the second-roller revolution operation reference point setting section.

10. The traction transmission capacity control device according to claim 9, wherein
the singular-point detecting section is further programmed to determine a first singular point of the revolution torque and/or the revolution speed detected by the revolution torque detecting section and/or the second-roller constant-speed revolving section during the revolution of the second roller in a first direction, and to determine a second singular point of the revolution torque and/or the revolution speed detected by the revolution torque detecting section and/or the second-roller constant-speed revolving section during the revolution of the second roller in a second direction; and
the second-roller revolution operation reference point setting section is further programmed to set the revolution operation reference point of the second roller based on a midpoint between a rotation position of the second roller at a time when the first singular point of the revolution torque and/or the revolution speed is detected during the revolution of the second roller in the first direction and a rotation position of the second roller at a time when the second singular point of the revolution torque and/or the revolution speed is detected during the revolution of the second roller in the second direction.

11. The traction transmission capacity control device according to claim 9, wherein
the power transmission apparatus is positioned such that the first roller is rotated together with a rotating member forming a torque transmission path to main driving wheels and such that the second roller is rotated together with a rotating member forming a torque transmission path to sub driving wheels, and the power transmission apparatus is used for a driving power distribution apparatus that distributes driving power between the main driving wheels and the sub driving wheels; and
the traction transmission capacity control device performs the traction transmission capacity control on the basis of an amount by which the second roller is revolved by using the second-roller revolving section from the second-roller revolution operation reference point set by the second-roller revolution operation reference point setting section, thereby making it possible to control the distribution of driving power between the main driving wheels and the sub driving wheels.

12. The traction transmission capacity control device according to claim 10, wherein
the power transmission apparatus is positioned such that the first roller is rotated together with a rotating member forming a torque transmission path to main driving wheels and such that the second roller is rotated together with a rotating member forming a torque transmission path to sub driving wheels, and the power transmission apparatus is used for a driving power distribution apparatus that distributes driving power between the main driving wheels and the sub driving wheels; and
the traction transmission capacity control device performs the traction transmission capacity control on the basis of an amount by which the second roller is revolved by using the second-roller revolving section from the second-roller revolution operation reference point set by the second-roller revolution operation reference point setting section, thereby making it possible to control the distribution of driving power between the main driving wheels and the sub driving wheels.

13. A traction transmission capacity control device used for a power transmission apparatus that performs power transmission through use of traction transmission obtained by radial-direction mutual pressing contact between a first roller and a second roller, in which a traction transmission capacity of the power transmission apparatus is controlled as a result of a second-roller revolving member controlling a radial-direction mutual pressing force exerted between the first roller and the second roller, the second-roller revolving member revolving the second roller around an eccentric axis offset from a rotational axis of the second roller, the traction transmission capacity control device comprising:
a controller including
a second-roller constant-force revolving section programmed to causes the second-roller revolving member to revolve the second roller at constant torque and to determine revolution torque of the second roller during the revolution of the second roller;
a revolution speed detecting section programmed to determine a revolution speed of the second roller during the revolution of the second roller;
a singular-point detecting section programmed to determine a singular point concerning a singular time-series change of the revolution speed of the second roller detected by the revolution speed detecting section while the second roller is revolving at a constant force by using the second-roller constant-force revolving section; and
a second-roller revolution operation reference point setting section programmed to set a revolution operation reference point of the second roller based on of the singular point of the revolution speed of the second roller detected by the singular-point detecting section while the second roller is revolving at a constant force,
the controller being programmed to perform the traction transmission capacity control using the revolution operation reference point of the second roller set by the second-roller revolution operation reference point setting section.

14. The traction transmission capacity control device according to claim 13, wherein
- the singular-point detecting section is further programmed to determine a first singular point of the revolution torque and/or the revolution speed detected by the second-roller constant-force revolving section and/or the revolution speed detecting section during the revolution of the second roller in a first direction, and to determine a second singular point of the revolution torque and/or the revolution speed detected by the second-roller constant-force revolving section and/or the revolution speed detecting section during the revolution of the second roller in a second direction; and
- the second-roller revolution operation reference point setting section is further programmed to set the revolution operation reference point of the second roller based on a midpoint between a rotation position of the second roller at a time when the first singular point of the revolution torque and/or the revolution speed is detected during the revolution of the second roller in the first direction and a rotation position of the second roller at a time when the second singular point of the revolution torque and/or the revolution speed is detected during the revolution of the second roller in the second direction.

15. The traction transmission capacity control device according to claim 13, wherein
- the power transmission apparatus is positioned such that the first roller is rotated together with a rotating member forming a torque transmission path to main driving wheels and such that the second roller is rotated together with a rotating member forming a torque transmission path to sub driving wheels, and the power transmission apparatus is used for a driving power distribution apparatus that distributes driving power between the main driving wheels and the sub driving wheels; and
- the traction transmission capacity control device performs the traction transmission capacity control on the basis of an amount by which the second roller is revolved by using the second-roller revolving section from the second-roller revolution operation reference point set by the second-roller revolution operation reference point setting section, thereby making it possible to control the distribution of driving power between the main driving wheels and the sub driving wheels.

16. The traction transmission capacity control device according to claim 14, wherein
- the power transmission apparatus is positioned such that the first roller is rotated together with a rotating member forming a torque transmission path to main driving wheels and such that the second roller is rotated together with a rotating member forming a torque transmission path to sub driving wheels, and the power transmission apparatus is used for a driving power distribution apparatus that distributes driving power between the main driving wheels and the sub driving wheels; and
- the traction transmission capacity control device performs the traction transmission capacity control on the basis of an amount by which the second roller is revolved by using the second-roller revolving section from the second-roller revolution operation reference point set by the second-roller revolution operation reference point setting section, thereby making it possible to control the distribution of driving power between the main driving wheels and the sub driving wheels.

* * * * *